United States Patent
Ohashi

(10) Patent No.: US 7,420,745 B2
(45) Date of Patent: Sep. 2, 2008

(54) ZOOM LENS AND INFORMATION DEVICE

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 11/412,946

(22) Filed: Apr. 28, 2006

(65) Prior Publication Data
US 2006/0262422 A1 Nov. 23, 2006

(30) Foreign Application Priority Data
Apr. 28, 2005 (JP) ............................. 2005-132912
May 31, 2005 (JP) ............................. 2005-160531

(51) Int. Cl.
G02B 15/14 (2006.01)
(52) U.S. Cl. ..................................... 359/687; 359/686
(58) Field of Classification Search ................. 359/686, 359/687
See application file for complete search history.

(56) References Cited

U.S. PATENT DOCUMENTS

| 5,570,233 | A | 10/1996 | Mihara et al. |
| 5,923,478 | A | 7/1999 | Hashimura |
| 6,081,385 | A | 6/2000 | Konno et al. |
| 6,101,043 | A | 8/2000 | Kohno et al. |
| 6,650,475 | B1 | 11/2003 | Hamano |
| 2002/0191304 | A1 | 12/2002 | Kitaoka et al. |
| 2004/0190157 | A1 | 9/2004 | Eguchi |
| 2005/0134971 | A1* | 6/2005 | Yamashita ................ 359/687 |
| 2006/0262422 | A1 | 11/2006 | Ohashi |

FOREIGN PATENT DOCUMENTS

| JP | 4-190211 | 7/1992 |
| JP | 4-296809 | 10/1992 |
| JP | 2859734 | 12/1998 |
| JP | 3008380 | 12/1999 |
| JP | 2001-56436 | 2/2001 |
| JP | 2003-315676 | 11/2003 |
| JP | 2004-212616 | 7/2004 |
| JP | 2004-212618 | 7/2004 |
| JP | 2004-226645 | 8/2004 |

OTHER PUBLICATIONS

U.S. Appl. No. 11/762,435, filed Jun. 13, 2007, Ohashi et al.

* cited by examiner

Primary Examiner—William C Choi
(74) Attorney, Agent, or Firm—Oblon, Spivak, McClelland, Maier & Neustadt, P.C.

(57) ABSTRACT

A zoom lens includes, in order from an object side, a first lens group having a positive refracting power, a second lens group having a negative refracting power, a third lens group having a positive refracting power, a fourth lens group having a positive refracting power, and the first lens group being moved to the object side during changing a magnification from a wide angle end to a telephoto end, and the fourth lens group comprises one positive lens, both surfaces of the positive lens are an aspheric surface, respectively, and total displacement of the first lens group during changing the magnification from the wide angle end to the telephoto end, X1 and an focal length of an entire system at the telephoto end, fT satisfy the following condition: (1) 0.30<X1/fT<0.85.

8 Claims, 22 Drawing Sheets

ZOOM LENS AND INFORMATION DEVICE

CROSS-REFERENCE TO RELATED APPLICATIONS

The present application is based on and claims priority from Japanese Application Nos. 2005-132912, filed on Apr. 28, 2005, and 2005-160531, filed on May 31, 2005, the disclosures of which are incorporated herein by reference in their entirety.

BACKGROUND OF THE INVENTION

1. Field of the Invention

The present invention relates to a zoom lens and an information device. The zoom lens according to the present invention can be suitably used for a digital camera, and also can be suitably used for a video camera and silver salt camera. The information device according to the present invention can be performed as a digital camera, video camera, silver salt camera, etc., and also can be performed as a personal digital assistance device.

2. Discussion of the Background

Recently, there has been widely spreading a digital camera and "a personal digital assistance device having a photographing function". A user has a wide variety of demands with respect to those devices. Especially, a user always requires high quality of a photographed image and a downsized device, and also requires both high performance (implementation of high resolution, wide field angle and larger changing magnification) and downsizing with respect to a zoom lens, which is used as a photographing lens.

In terms of the downsizing of zoom lens, it is necessary to reduce the entire length of the zoom lens (the distance from the lens surface of the most object side to the image surface) when used. It is also important to reduce the thickness of each lens group to control the entire length when collapsed.

In the high performance of zoom lens, it is necessary to have high resolution corresponding to an image pickup device having at least 4 million pixels, desirably, 8 million pixels or more over "the entire zoom area" from the aspect of resolution.

Moreover, there are many users requiring the wider field angle of zoom lens. In terms of the wider field angle, it is desirable that "a half field angle at the wide angle end: 38 degrees or more". "The half field angle: 38 degrees" corresponds 28 mm with "the focal length of conversion of 35 mm silver salt camera (i.e., Leica)".

Furthermore, relatively larger changing magnification ratio is desired, but in terms of larger changing magnification ratio, it is considered that general photographing can be mostly performed if it is a zoom lens corresponding to about 28-135 mm (about 4.8 times) with the focal length of conversion of 35 mm silver salt camera.

Conventionally, as a zoom lens having a four-groups structure, there has been disclosed a zoom lens comprising a first lens group having a positive refracting power, a second lens group having a negative refracting power, an aperture stop, a third lens group having a positive refracting power, and a fourth lens group having a positive refracting power, sequentially arranged from an object side, and during changing the magnification from the wide angle end to the telephoto end, the first lens group and the third lens group being monotonically moved to the object side, the second lens group being fixed, and the fourth lens group being moved (reference to JP-A-H04-190211).

Moreover, similar to the above four-groups structure, there has been disclosed a zoom lens that the first lens group and the third lens group monotonically move to the object side, the second lens group monotonically moves to the image side, and the fourth lens group moves, during changing the magnification from the wide angle end to the telephoto end (reference to JP-A-H04-296809).

Furthermore, similar to the above four-groups structure, there has been disclosed a zoom lens that the first lens group and the third lens group monotonically move to the object side, and the second lens group moves to the object side after moving to the image side, during changing the magnification from the wide angle end to the telephoto end (reference JP-A-2003-315676, JP-A-2004-212616, JP-A-2004-212618, and JP-A-2004-226645).

In the zoom lenses disclosed in JP-A-H04-190211 and JP-A-H04-296809, there is still room for improvement in the wider field angle because the half filed angle at the wide angle end is about 25-32 degrees.

In the zoom lenses disclosed in JP-A-2003-315676, JP-A-2004-212616, JP-A-2004-212618, and JP-A-2004-226645, the half field angle at the wide angle end: about 34-37 degrees is proposed; however, there is still room for improvement in the larger changing magnification because the changing magnification ratio is over 4 times from the aspect of changing magnification.

SUMMARY OF THE INVENTION

Therefore, the present invention has been made in view of the above circumstances, an object of the present invention is to provide a zoom lens having a sufficient wide field angle that a half field angle at a wide angle end is 38 degrees or more, changing magnification ratio of 4.5 times or more and resolution corresponding to a small image pickup device having 4 million to 8 million pixels or more, and also to provide "an information device having a photographing function" that the high performance zoom lens is used as an optical system for photographing.

In order to achieve the above objects, a zoom lens according to the first aspect of the present invention comprises, in order from an object side, a first lens group having a positive refracting power; a second lens group having a negative refracting power; a third lens group having a positive refracting power; a fourth lens group having a positive refracting power; and the first lens group being moved to the object side during changing a magnification from a wide angle end to a telephoto end, wherein the fourth lens group consists of one positive lens, both surfaces of the positive lens are an aspheric surface, respectively, and total displacement of the first lens group during changing the magnification from the wide angle end to the telephoto end, X1 and an focal length of an entire system at the telephoto end, fT satisfy the following condition: (1) $0.30 < X1/fT < 0.85$.

An information device comprising a photographing function according to a second aspect of the present invention, wherein the above described zoom lens is used as an optical system for photographing.

A zoom lens according to a third aspect of the present invention comprises, in order from an object side, a first lens group having a positive refracting power; a second lens group having a negative refracting power; a third lens group having a positive refracting power; a fourth lens group having a positive refracting power; and at least the first lens group and the third lens group being moved to the object side such that an interval between the first lens group and the second lens group increases, an interval between the second lens group and the third lens group decreases and an interval between the third lens group and the fourth lens group increases during changing a magnification from a wide angle end to a telephoto end, wherein the first lens group comprises one negative lens and two positive lenses, the fourth lens group consists of one positive lens, and a focal length of an entire system at the wide angle end, fw, and a curvature radius of the object side surface of the positive lens comprising the fourth lens group, r4F satisfy the following condition: (11) 1.6<r4F/fw<4.0.

A zoom lens according to a fourth aspect of the present invention comprises, in order from an object side, a first lens group having a positive refracting power; a second lens group having a negative refracting power; a third lens group having a positive refracting power; a fourth lens group having a positive refracting power; and at least the first lens group and the third lens group being moved to the object side such that a distance between the first lens group and the second lens group increases, a distance between the second lens group and the third lens group decreases and a distance between the third lens group and the fourth lens group increases during changing a magnification from a wide angle end to a telephoto end, wherein the fourth lens group consists of one positive lens having an aspheric surface on both surfaces, and a focal length of an entire system at the wide angle end, fw, and a radius curvature of the object side surface of the positive lens comprising the fourth lens group, r4F satisfy the following condition: (11) 1.6<r4F/fw<4.0.

An information device having a photographing function according to a fifth aspect of the present invention, wherein the above zoom lens is used as an optical system for photographing.

Further, according to one aspect of the present invention, a focal length of the first lens group, f1, and a focal length of the entire system at the wide angle end, fW satisfy the following condition:

$6.0 < f1/fW < 12.0$.

Further, according to another aspect of the present invention, the Abbe number of the positive lens comprising the fourth lens group, $v_4$ satisfies the following condition:

$50 < v_4 < 75$.

Further, according to another aspect of the present invention, the fourth lens group positions closer to the image side at the telephoto end than the wide angle end. Further, according to another aspect of the present invention, an imaging magnification of the fourth lens group at the telephoto end, m4T satisfies the following condition:

$0.60 < m4T < 0.85$.

Further, according to another aspect of the present invention, the imaging magnification of the fourth lens group at the telephoto end, m4T and an imaging magnification of the fourth lens group at the wide angle end, m4W satisfy the following condition:

$1.0 < m4T/m4W < 1.3$.

Further, according to another aspect of the present invention, the second lens group is not displaced during changing the magnification.

Further, according to another aspect of the present invention, an aperture stop is disposed between the second lens group and the third lens group, and the aperture stop moves independently of the neighboring lens groups during changing the magnification.

Further, according to another aspect of the present invention, an axial distance between the aperture stop and the surface of the most object side of the third lens group at the wide angle end, dsw satisfies the following condition:

$0.08 < dsw/fT < 0.20$.

Further, according to another aspect of the present invention, an interval between the aperture stop and the third lens group becomes wider at the wide angle end than the telephoto end.

Further, according to an aspect of the present invention, the number of pixels of the image pickup device is 4 million to 8 million pixels or more.

Further, according to still another aspect of the present invention, the total displacement of the first lens group during changing the magnification from the wide angle end to the telephoto end, X1 and a focal length of an entire system at the telephoto end, fT satisfy the following condition:

$0.30 < X1/f1 < 0.85$.

Further, according to still a further aspect of the present invention, the total displacement of the third lens group during changing the magnification from the wide angle end to the telephoto end, X3 and a focal length of an entire system at the telephoto end, fT satisfy the following condition:

$0.15 < X3/fT < 0.50$.

Further, according to another aspect of the present invention, a focal length of the second lens group, f2 and a focal length of the third lens group, f3 satisfy the following condition:

$0.6 < |f2|/f3 < 1.0$.

Further, according to still another aspect of the present invention, a focal length of the first lens group, f1 and the focal length of the entire system at the wide angle end, fw satisfy the following condition:

$6.0 < f1/fw < 12.0$.

Further, according to another aspect of the present invention, a negative lens having a strong concave surface on the image side is arranged in the most image side of the third lens group, and a curvature radius of the image side surface of the negative lens, r3R satisfies the following condition:

$0.7 < |r3R|/fw < 1.3$.

Further, according to still another aspect of the present invention, an axial distance between the aperture stop and the surface of the most object side of the third lens group at the wide angle end, dsw satisfies the following condition:

$0.08 < dsw/fT < 0.20$.

Further, according to another aspect of the present invention, during changing the magnification from the wide angle end to the telephoto end, the fourth lens group is fixed, the first and third lens groups move to the object side, and the second lens group moves to the image side along a convex curve.

Further, according to another aspect of the present invention, during changing the magnification from the wide angle end to the telephoto end, the second lens group is fixed, the first and third lens groups move to the object side, and the fourth lens group moves to the image side.

Further, according to another aspect of the present invention, the fourth lens group positions closer to the image side at the telephoto end than the wide angle end.

Further, according to another aspect of the present invention, an imaging magnification of the fourth lens group at the telephoto end, m4T satisfies the following condition:

$0.60 < m4T < 0.85$.

Further, according to a still further aspect of the present invention, an imaging magnification of the fourth lens group at the telephoto end, m4T and an imaging magnification of the fourth lens group at the wide angle end, m4W satisfy the following condition:

1.0<m4T/m4W<1.3.

Further, according to another aspect of the present invention, the number of pixels of the image pickup device is 4 million to 8 million pixels or more.

DETAILED DESCRIPTION OF THE PREFERRED EMBODIMENTS

Figure 1:
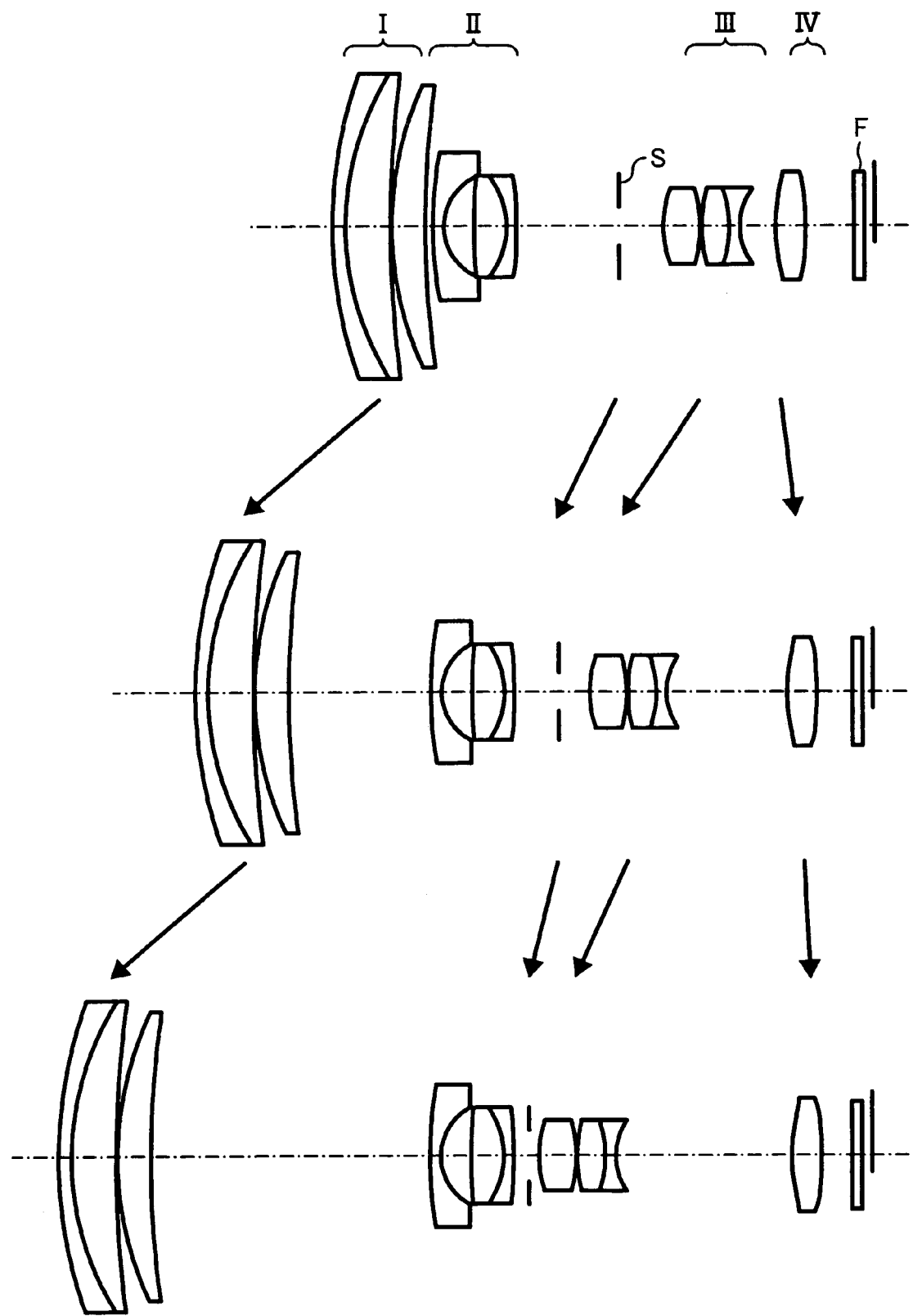
FIG. 1 is a view showing a lens structure and movement of each lens group in a first embodiment.

Hereinafter specific first to fourth embodiments of a zoom lens according to the present invention will be described. The maximum image height in the first to fourth embodiments is 3.70 mm. In each of the embodiments, a parallel plate (F in FIGS. 1-4) arranged in an image surface side of a fourth lens group can be various filters such as an optical lowpass filter and infrared protection filter, and a cover glass (seal glass) of image pickup device such as a CCD sensor. A unit expressing a length is mm unless it is mentioned.

The fourth embodiment shows an example that a fourth lens group is fixed during changing the magnification. Other embodiments show an example that a second lens group is fixed during changing the magnification. In the displacement of the second lens group, the second lens group can be monotonically moved to the image side from the wide angle end toward the telephoto end, and also the second lens group can be moved such that the movement locus during changing the magnification represents a curved line having a convex on the image side.

The material of the lenses is all optical glass except that the tenth lens in the first embodiment, the ninth lens in the second embodiment and the tenth lens in the third embodiment (fourth lens group) comprise optical plastic. In each of the embodiments, aberrations are sufficiently corrected, and the lenses can be applied to a light receiving element having 4 million to 8 million pixels or more.

Meanings of sings in the embodiments are as follows.
f: focal length of entire system
F: F-number
ω: half field angle
R: curvature radius (paraxial curvature radius in aspheric surface)
D: surface separation
Nd: refractive index
vd: Abbe number
K: cone constant of aspheric surface
$A_4$: $4^{th}$ aspheric surface coefficient
$A_6$: $6^{th}$ aspheric surface coefficient
$A_8$: $8^{th}$ aspheric surface coefficient
$A_{10}$: $10^{th}$ aspheric surface coefficient
$A_{12}$: $12^{th}$ aspheric surface coefficient
$A_{14}$: $14^{th}$ aspheric surface coefficient
$A_{16}$: $16^{th}$ aspheric surface coefficient
$A_{18}$: $18^{th}$ aspheric surface coefficient The aspheric surface shape is expressed by the following known equation using an inverse number of paraxial radius curvature (paraxial curvature), C, a height from an optical axis, H, a cone constant number, K, and an aspheric surface coefficient of each of the above degrees, and adopting an aspheric surface amount in the optical axis direction as X.

$$X = CH^2/1 + \sqrt{(1-(1+K)C^2H^2)} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot A^{18}.$$

The shape is specified by providing a paraxial radius curvature, a cone constant number and aspheric surface coefficient.

First Embodiment
f = 4.74-31.88, F = 3.49-5.02, ω = 39.20-6.50

| Surface No. | R | D | Nd | νd | Remarks |
|---|---|---|---|---|---|
| 01 | 35.951 | 1.00 | 1.84666 | 23.78 | First Lens |
| 02 | 22.834 | 3.44 | 1.49700 | 81.54 | Second Lens |
| 03 | 92.407 | 0.10 | | | |
| 04 | 26.507 | 2.58 | 1.80400 | 46.57 | Third Lens |
| 05 | 79.541 | Variable (A) | | | |
| *06 | 37.724 | 0.84 | 1.80400 | 46.57 | Fourth Lens |
| 07 | 4.355 | 2.31 | | | |
| 08 | 48.799 | 2.51 | 1.76182 | 26.52 | Fifth Lens |
| 09 | −6.568 | 0.74 | 1.83481 | 42.71 | Sixth Lens |
| *10 | −96.317 | Variable (B) | | | |
| 11 | Aperture Stop | Variable (C) | | | |
| *12 | 7.796 | 2.85 | 1.58913 | 61.15 | Seventh Lens |
| *13 | −10.195 | 0.10 | | | |
| 14 | 11.746 | 2.16 | 1.77250 | 49.60 | Eighth Lens |
| 15 | −8.479 | 0.80 | 1.71736 | 29.52 | Ninth Lens |
| 16 | 4.849 | Variable (D) | | | |
| *17 | 13.600 | 2.28 | 1.52470 | 56.20 | Tenth Lens |
| *18 | −29.129 | Variable (E) | | | |
| 19 | ∞ | 0.80 | 1.51680 | 64.20 | Various Filters |
| 20 | ∞ | | | | |

In addition, in the above table, a sign, * shows an aspheric surface.
It is the same as other embodiments.

Aspheric Surface: Sixth Surface $K = 0.0$,
$A_4 = 8.99680 \times 10^{-5}, A_6 = 1.17385 \times 10^{-5}$,
$A_8 = -2.28174 \times 10^{-6}, A_{10} = 1.61797 \times 10^{-7}$,
$A_{12} = -4.87869 \times 10^{-9}, A_{14} = 2.49023 \times 10^{-11}$,
$A_{16} = 1.66865 \times 10^{-12}, A_{18} = -2.55153 \times 10^{-14}$ Aspheric Surface: Tenth Surface $K = 0.0$,
$A_4 = -4.17819 \times 10^{-4}, A_6 = -1.85516 \times 10^{-5}$,
$A_8 = 1.73536 \times 10^{-6}, A_{10} = -1.09898 \times 10^{-7}$ Aspheric Surface: Twelfth Surface $K = 0.0$,
$A_4 = -6.52161 \times 10^{-4}, A_6 = -1.64731 \times 10^{-5}$,
$A_8 = 5.08316 \times 10^{-6}, A_{10} = -4.47602 \times 10^{-7}$ Aspheric Surface: Thirteenth Surface $K = 0.0$,
$A_4 = 3.04932 \times 10^{-4}, A_6 = -1.84286 \times 10^{-5}$,
$A_8 = 3.75632 \times 10^{-6}, A_{10} = -2.69027 \times 10^{-7}$ Aspheric Surface: Seventeenth Surface $K = 0.0$,
$A_4 = 6.36181 \times 10^{-5}, A_6 = -2.03691 \times 10^{-5}$,
$A_8 = -3.14875 \times 10^{-7}, A_{10} = -7.89983 \times 10^{-9}$ Aspheric Surface: Eighteenth Surface $K = 0.0$,
$A_4 = 2.63195 \times 10^{-4}, A_6 = -4.01829 \times 10^{-5}$.

-continued

| | Variable Spacing | | |
|---|---|---|---|
| | Short focus end f = 4.740 | Intermediate focal length f = 12.313 | Long focus end f = 31.883 |
| A | 0.600 | 10.861 | 21.200 |
| B | 7.955 | 3.420 | 1.150 |
| C | 3.400 | 2.374 | 0.750 |
| D | 2.745 | 9.291 | 13.554 |
| E | 3.693 | 2.706 | 2.285 |

Figure 5:
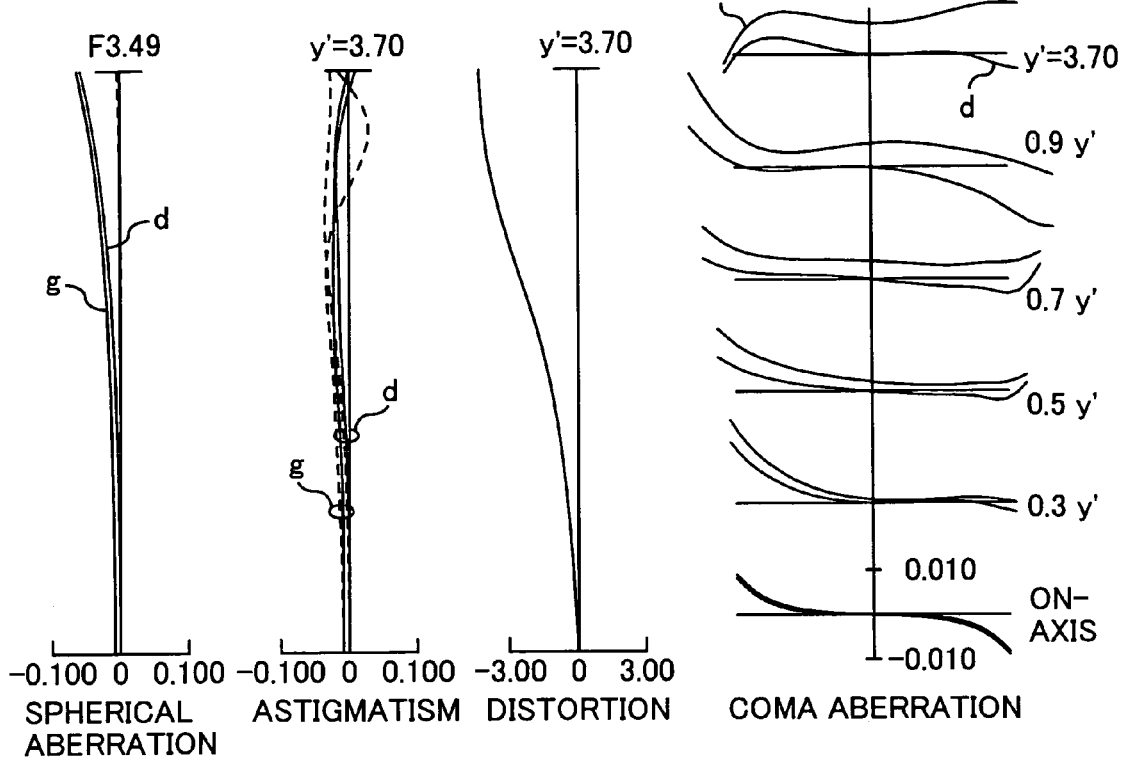
FIG. 5 is a view showing aberrations at a short focus end of the first embodiment.
Figure 6:
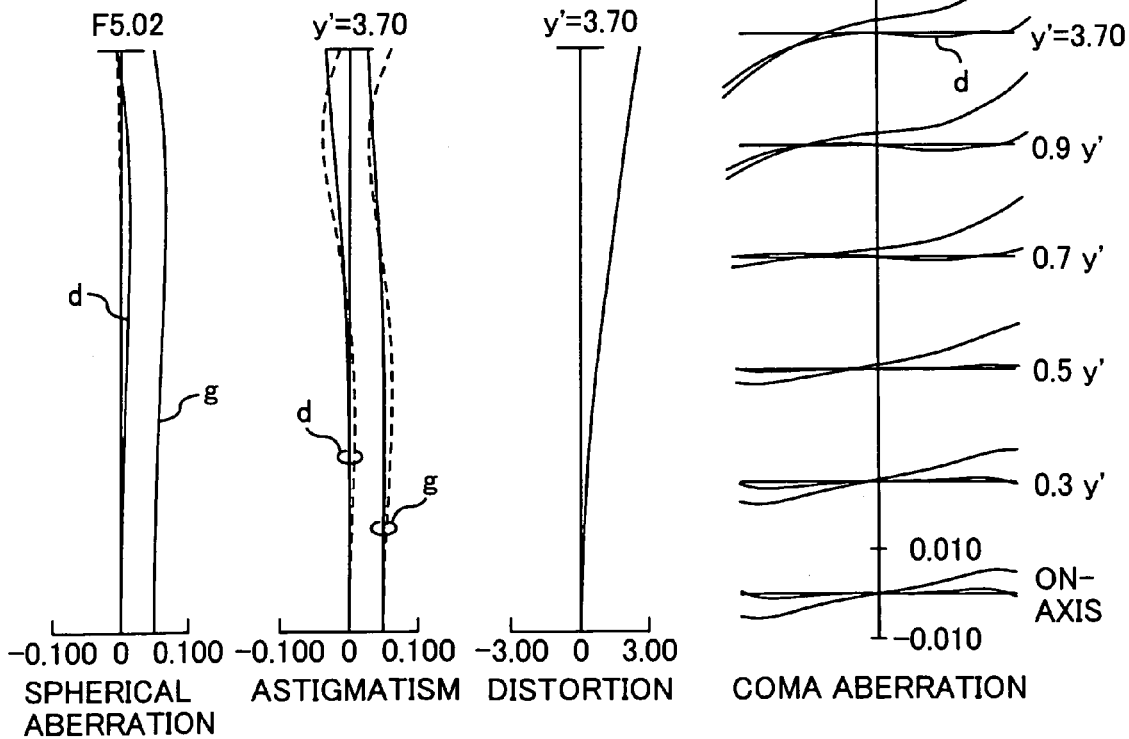
FIG. 6 is a view showing aberrations at an intermediate focus end of the first embodiment.
Figure 7:
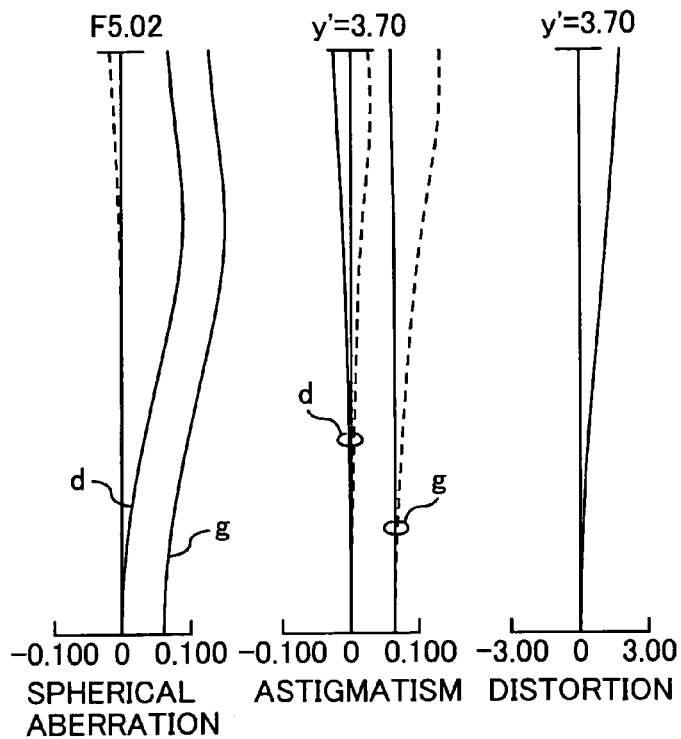
FIG. 7 is a view showing aberrations at a telephoto end of the first embodiment.
Figure 7:
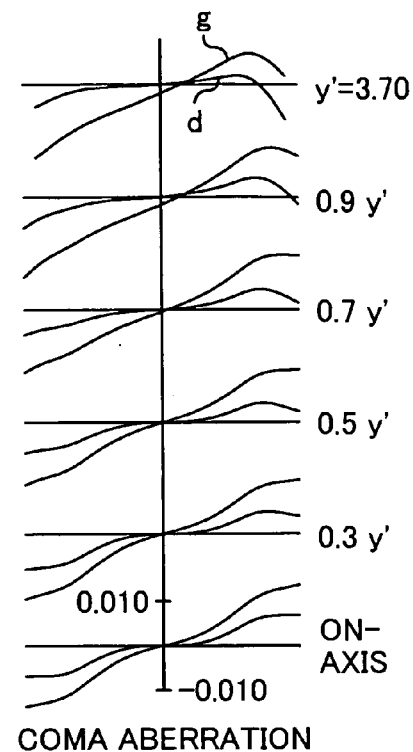

A value of parameter in each condition $(N_4 - 1) X_{40} (H_{0.8})/Y'$ max = −0.00331
$\{(N_4 - 1) X_{40} (H_{0.8}) + (1 - N_4) X_{41} (H_{0.8})\}/Y'$ max = 0.00013
$X1/fT = 0.646$
$X3/fT = 0.297$
$|f2|/f3 = 0.733$
$f1/fW = 9.07$
$dsw/fT = 0.107$
$m4T = 0.742$
$m4T/m4W = 1.118$ FIG. 1 shows the lens group arrangements of a wide angle end (upper figure), an intermediate focal length (middle figure), and telephoto end (lower figure) of a zoom lens in the first embodiment. FIGS. 5, 6, 7 show the aberration diagrams in the short focus end (wide angle end), intermediate focal length, long focus end (telephoto end) of the first embodiment. In addition, the dashed line in the spherical aberration diagram illustrates a sine condition, the solid line in the astigmatic diagram illustrates sagittal, and the dashed line in the astigmatic diagram illustrates meridional.

Second Embodiment
f = 4.74-21.53, F = 3.56-4.87, ω = 39.21-9.51

| Surface No. | R | D | Nd | νd | Remarks |
|---|---|---|---|---|---|
| 01 | 24.090 | 1.00 | 1.84666 | 23.78 | First lens |
| 02 | 15.338 | 0.20 | | | |
| 03 | 15.754 | 3.44 | 1.77250 | 49.60 | Second lens |
| 04 | 154.172 | Variable (A) | | | |
| *05 | 82.028 | 0.84 | 1.83481 | 42.71 | Third lens |
| 06 | 4.385 | 1.77 | | | |
| 07 | 13.562 | 2.77 | 1.74077 | 27.79 | Fourth lens |
| 08 | −6.671 | 0.74 | 1.83481 | 42.71 | Fifth lens |
| *09 | 120.147 | Variable (B) | | | |
| 10 | Aperture stop | Variable (C) | | | |
| *11 | 7.604 | 2.59 | 1.58913 | 61.15 | Sixth lens |
| *12 | −9.866 | 0.10 | | | |
| 13 | 15.681 | 2.41 | 1.83481 | 42.71 | Seventh lens |
| 14 | −4.541 | 0.80 | 1.69895 | 30.13 | Eighth lens |
| 15 | −4.541 | Variable (D) | | | |
| *16 | 12.500 | 2.25 | 1.54340 | 56.00 | Ninth lens |
| *17 | −32.144 | Variable (E) | | | |
| 18 | ∞ | 0.90 | 1.51680 | 64.20 | Various filters |
| 19 | ∞ | | | | |

Aspheric Surface: Fifth Surface $K = 0.0$,
$A_4 = 2.78257 \times 10^{-4}, A_6 = 8.25852 \times 10^{-6}$,
$A_8 = -2.24987 \times 10^{-6}, A_{10} = 1.67256 \times 10^{-7}$,
$A_{12} = -5.29948 \times 10^{-9}, A_{14} = 2.43172 \times 10^{-11}$,
$A_{16} = 2.30994 \times 10^{-12}, A_{18} = -3.76339 \times 10^{-14}$ -continued Aspheric Surface: Ninth Surface K = 0.0,
$A_4 = -4.33349 \times 10^{-4}, A_6 = -2.06589 \times 10^{-5}$,
$A_8 = 8.90862 \times 10^{-7}, A_{10} = -9.10750 \times 10^{-8}$
Aspheric Surface: Eleventh Surface K = 0.0,
$A_4 = -8.06741 \times 10^{-4}, A_6 = -6.20300 \times 10^{-6}$,
$A_8 = 4.11951 \times 10^{-6}, A_{10} = -2.35417 \times 10^{-7}$
Aspheric Surface: Twelfth Surface K = 0.0,
$A_4 = 6.93467 \times 10^{-4}, A_6 = -2.26772 \times 10^{-7}$,
$A_8 = 3.01081 \times 10^{-6}, A_{10} = -3.11314 \times 10^{-8}$
Aspheric Surface: Sixteenth Surface K = 0.0,
$A_4 = 5.14112 \times 10^{-4}, A_6 = -5.29967 \times 10^{-5}$,
$A_8 = 9.80029 \times 10^{-7}, A_{10} = -5.46408 \times 10^{-8}$
Aspheric Surface: Seventeenth Surface K = 0.0,
$A_4 = 7.97963 \times 10^{-4}, A_6 = -6.99274 \times 10^{-5}$.

Variable Spacing

| | Short focus end<br>f = 4.740 | Intermediate focal length<br>f = 10.102 | Long focus end<br>f = 21.530 |
|---|---|---|---|
| A | 0.600 | 6.426 | 15.775 |
| B | 7.123 | 4.083 | 1.200 |
| C | 3.101 | 1.200 | 1.000 |
| D | 2.000 | 7.744 | 10.927 |
| E | 3.429 | 2.599 | 2.491 |

A value of parameter in each condition $(N_4 - 1) X_{40} (H_{0.8})/Y' \max = -0.00018$
$\{(N_4 - 1) X_{40} (H_{0.8}) + (1 - N_4) X_{41} (H_{0.8})\}/Y' \max = 0.00033$
X1/fT = 0.705
X3/fT = 0.373
|f2|/f3 = 0.800
f1/fW = 8.56
dsw/fT = 0.144
m4T = 0.706
m4T/m4W = 1.086

Figure 2:
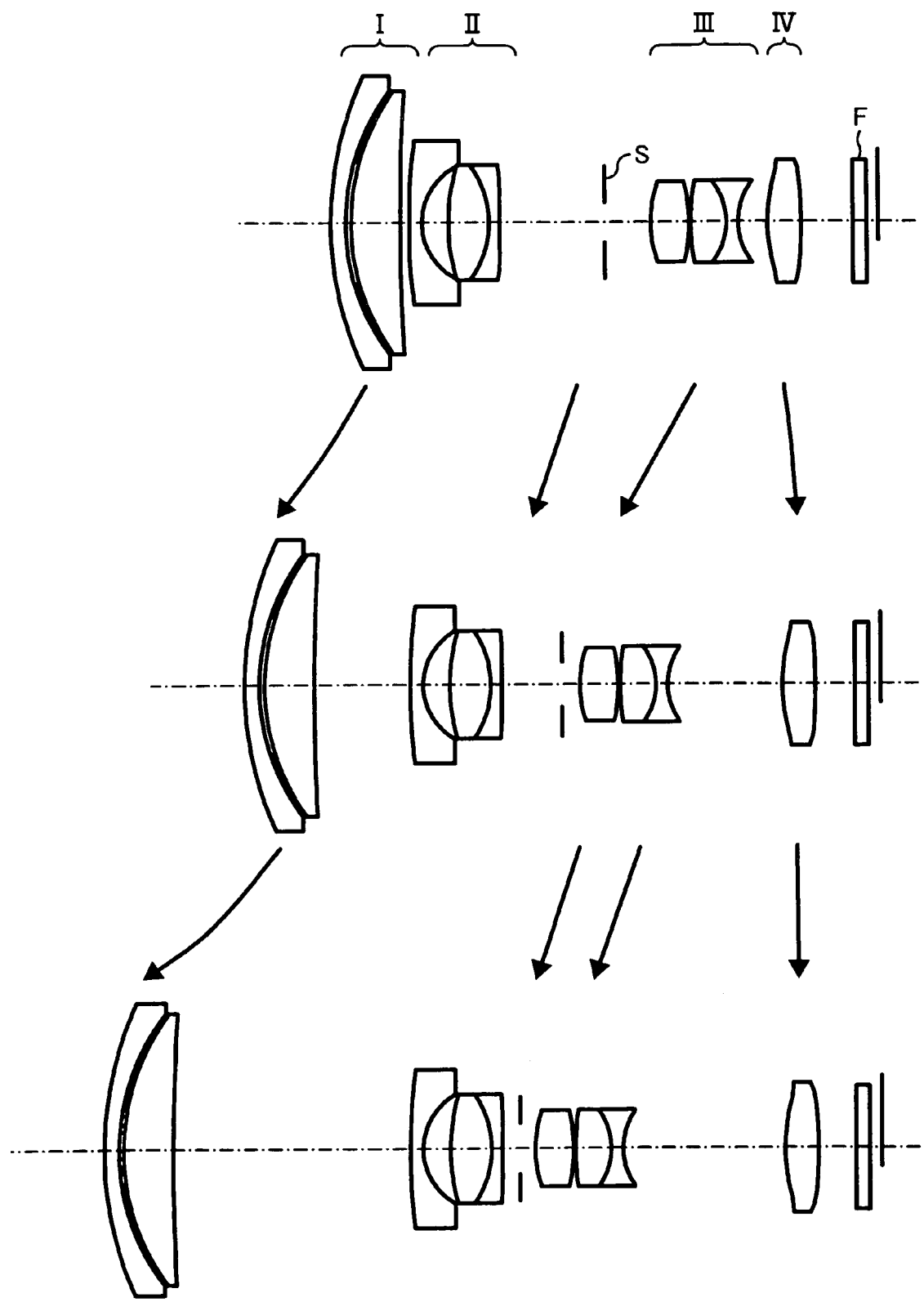
FIG. 2 is a view showing a lens structure and movement of each lens group in a second embodiment.
Figure 8:
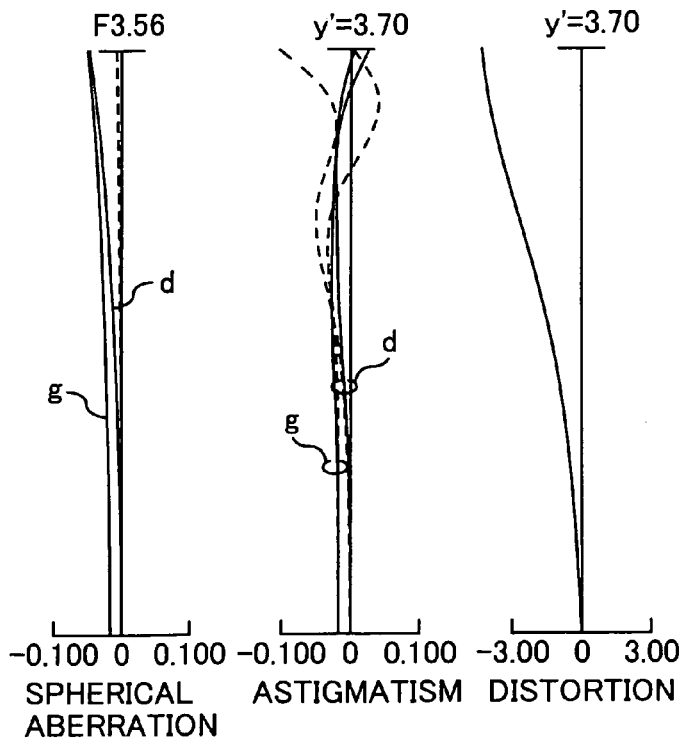
FIG. 8 is a view showing aberrations at a short focus end of the second embodiment.
Figure 8:
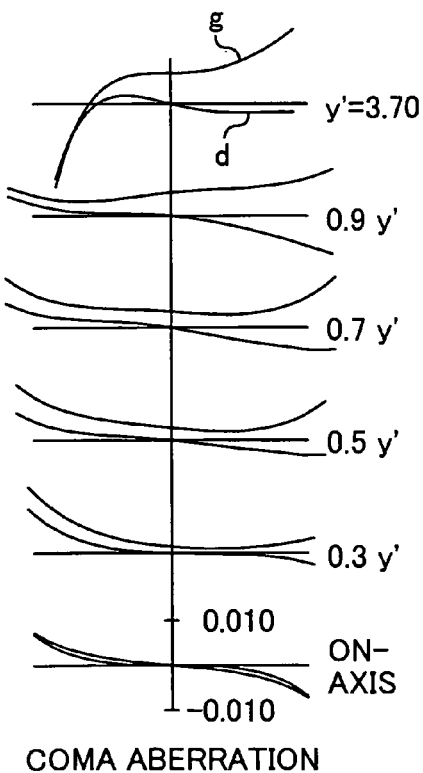
Figure 9:
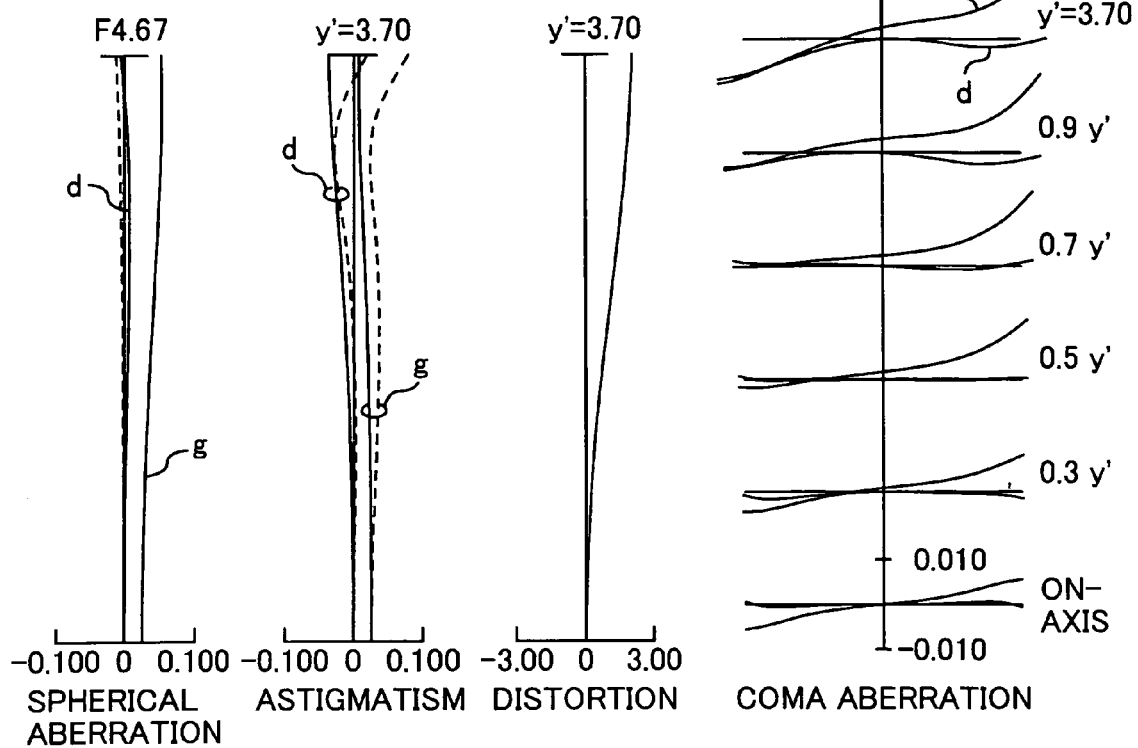
FIG. 9 is a view showing aberrations at an intermediate focus end of the second embodiment.
Figure 10:
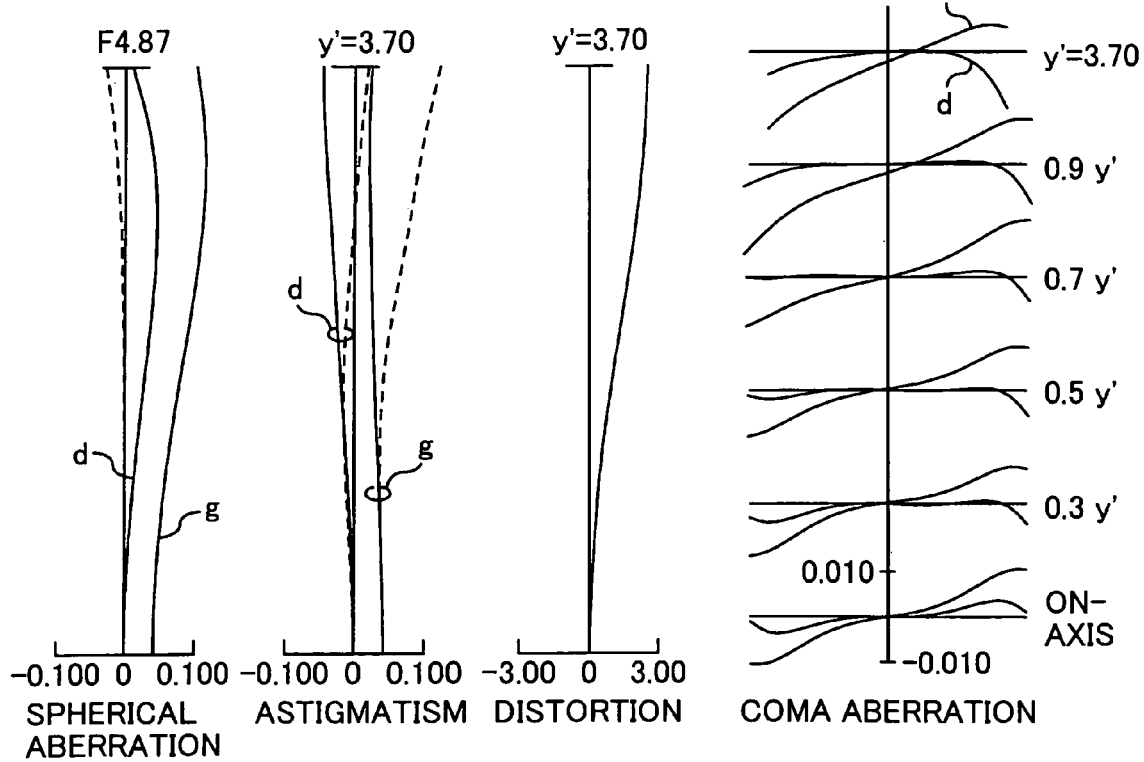
FIG. 10 is a view showing aberrations at a telephoto end of the second embodiment.

FIG. 2 shows the lens group arrangements of the wide angle end, intermediate focal length and telephoto end of the zoom lens according to the second embodiment as shown in FIG. 1. FIGS. 8, 9, 10 show the aberration diagrams in the short focus end (wide angle end), intermediate focal length and long focus end (telephoto end) of the second embodiment.

Third Embodiment
f = 4.74-31.92, F = 3.41-4.96, ω = 39.21-6.50

| Surface No. | R | D | Nd | νd | Remarks |
|---|---|---|---|---|---|
| 01 | 41.855 | 1.00 | 1.92286 | 18.90 | First lens |
| 02 | 25.753 | 3.56 | 1.49700 | 81.54 | Second lens |
| 03 | 190.984 | 0.10 | | | |
| 04 | 26.286 | 2.60 | 1.80100 | 34.97 | Third lens |
| 05 | 79.407 | Variable (A) | | | |
| *06 | 49.690 | 0.84 | 1.80400 | 46.57 | Fourth lens |
| 07 | 4.425 | 2.16 | | | |
| 08 | 31.461 | 2.56 | 1.76182 | 26.52 | Fifth lens |
| 09 | −6.729 | 0.74 | 1.83481 | 42.71 | Sixth lens |
| *10 | −192.919 | Variable (B) | | | |
| 11 | Aperture stop | Variable (C) | | | |
| *12 | 8.333 | 3.24 | 1.58913 | 61.15 | Seventh lens |
| *13 | −9.750 | 0.10 | | | |
| 14 | 12.866 | 2.30 | 1.77250 | 49.60 | Eighth lens |
| 15 | −6.860 | 0.92 | 1.69895 | 30.13 | Ninth lens |
| 16 | 4.883 | Variable (D) | | | |
| *17 | 14.000 | 2.24 | 1.52470 | 56.20 | Tenth lens |
| *18 | −27.429 | Variable (E) | | | |
| 19 | ∞ | 0.80 | 1.51680 | 64.20 | Various filters |
| 20 | ∞ | | | | |

Aspheric Surface: Sixth Surface

K = 0.0,
$A_4 = 1.35106 \times 10^{-4}, A_6 = 7.13509 \times 10^{-6}$,
$A_8 = -2.03682 \times 10^{-6}, A_{10} = 1.58321 \times 10^{-7}$,
$A_{12} = -4.98957 \times 10^{-9}, A_{14} = 2.26545 \times 10^{-11}$,
$A_{16} = 1.98630 \times 10^{-12}, A_{18} = -3.06836 \times 10^{-14}$
Aspheric Surface: Tenth Surface K = 0.0,
$A_4 = -4.40187 \times 10^{-4}, A_6 = -1.48144 \times 10^{-5}$,
$A_8 = 1.18271 \times 10^{-6}, A_{10} = -9.13757 \times 10^{-8}$
Aspheric surface: Twelfth surface K = 0.0,
$A_4 = -7.36357 \times 10^{-4}, A_6 = 2.56137 \times 10^{-6}$,
$A_8 = 6.10932 \times 10^{-7}, A_{10} = -1.13596 \times 10^{-7}$
Aspheric Surface: Thirteenth Surface K = 0.0,
$A_4 = 2.25294 \times 10^{-4}, A_6 = -9.54574 \times 10^{-7}$,
$A_8 = 6.24322 \times 10^{-7}, A_{10} = -8.33183 \times 10^{-8}$
Aspheric Surface: Seventeenth Surface K = 0.0,
$A_4 = 1.32808 \times 10^{-4}, A_6 = -1.93965 \times 10^{-5}$,
$A_8 = -1.13182 \times 10^{-7}, A_{10} = -9.68041 \times 10^{-9}$
Aspheric Surface: Eighteenth Surface K = 0.0,
$A_4 = 2.76724 \times 10^{-4}, A_6 = -3.54986 \times 10^{-5}$.

Variable Spacing

| | Short focus end<br>f = 4.738 | Intermediate focal length<br>f = 12.316 | Long focus end<br>f = 31.917 |
|---|---|---|---|
| A | 0.667 | 11.185 | 21.200 |
| B | 7.739 | 2.784 | 1.150 |
| C | 3.447 | 2.914 | 0.750 |
| D | 2.000 | 8.424 | 13.152 |
| E | 3.986 | 3.028 | 2.072 |

A value of parameter in each condition $(N_4 - 1) X_{40} (H_{0.8})/Y' \max = -0.00166$
$\{(N_4 - 1) X_{40} (H_{0.8}) + (1 - N_4) X_{41} (H_{0.8})\}/Y' \max = 0.00032$
X1/fT = 0.643
X3/fT = 0.291
|f2|/f3 = 0.743
f1/fW = 8.98
dsw/fT = 0.108
m4T = 0.756
m4T/m4W = 1.164

Figure 3:
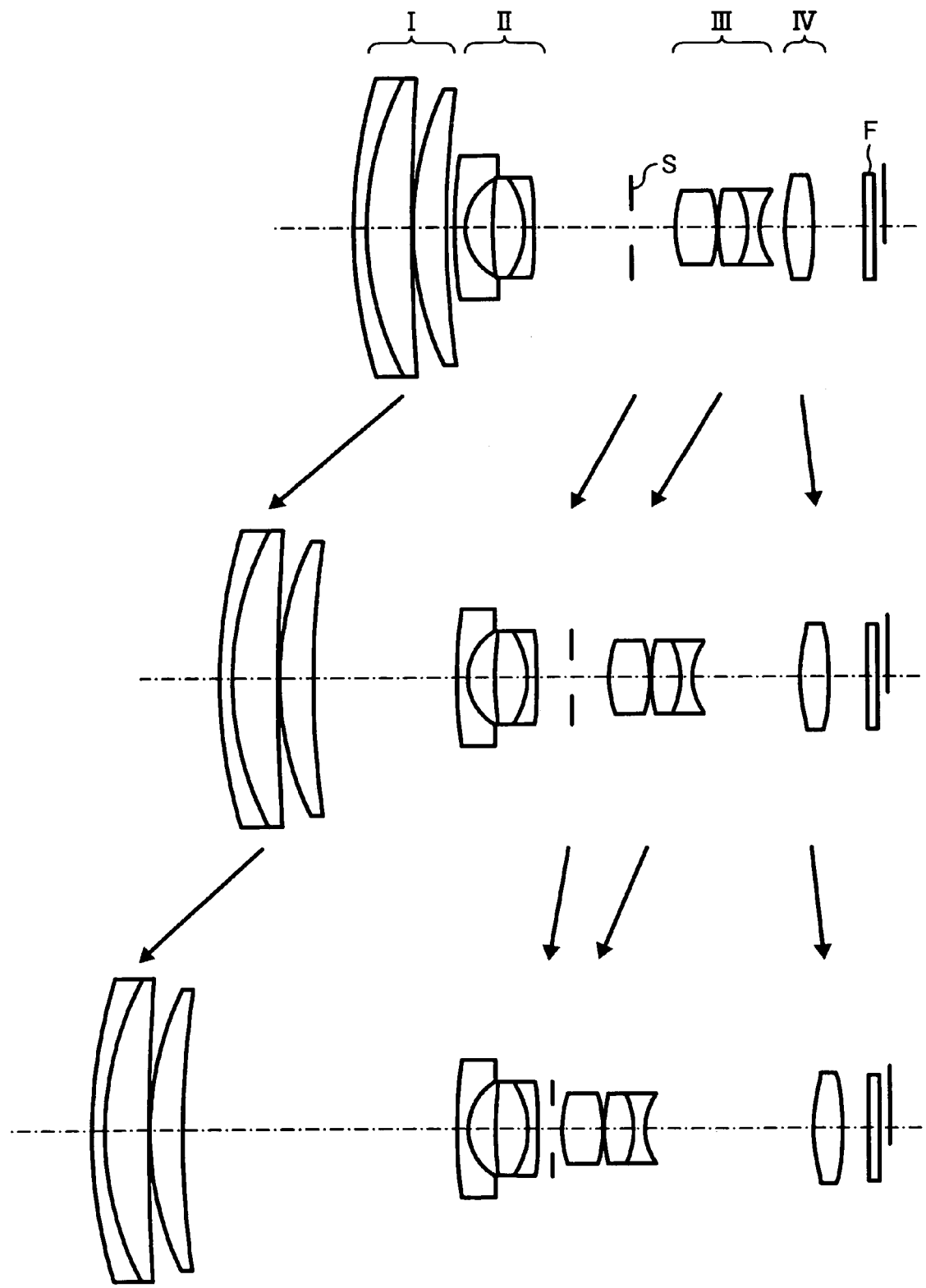
FIG. 3 is a view showing a lens structure and movement of each lens group in a third embodiment.
Figure 11:
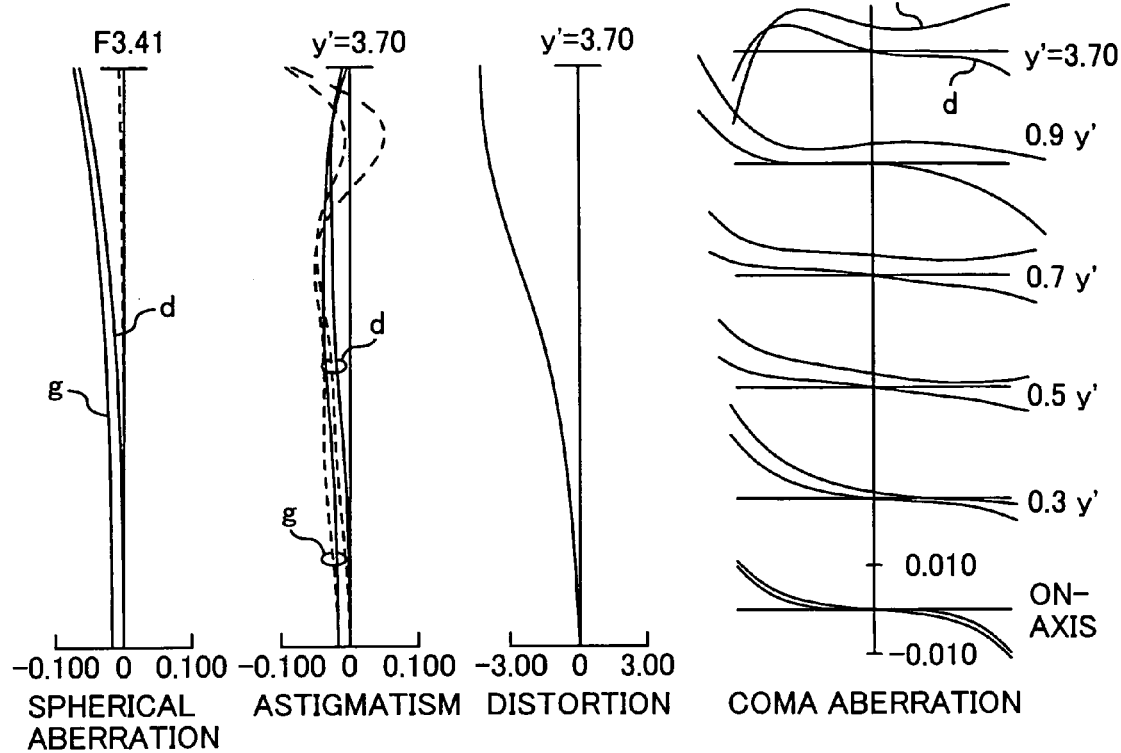
FIG. 11 is a view showing aberrations at a short focus end of the third embodiment.
Figure 12:
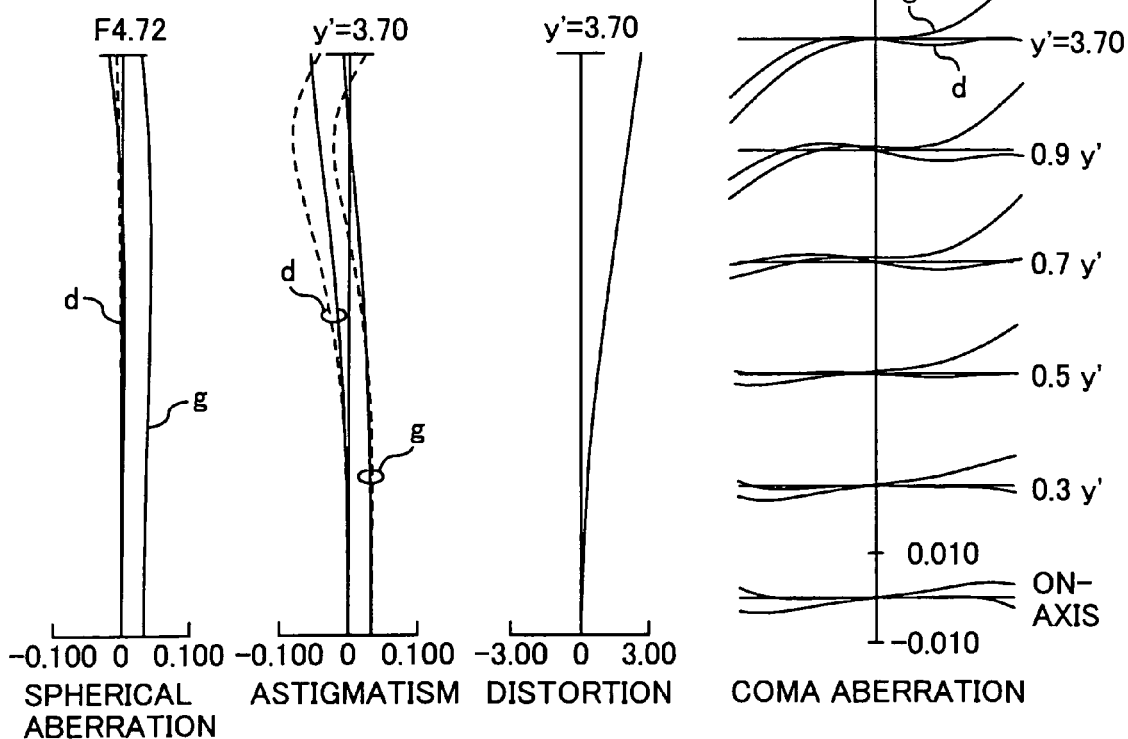
FIG. 12 is a view showing aberrations at an intermediate focus end of the third embodiment.
Figure 13:
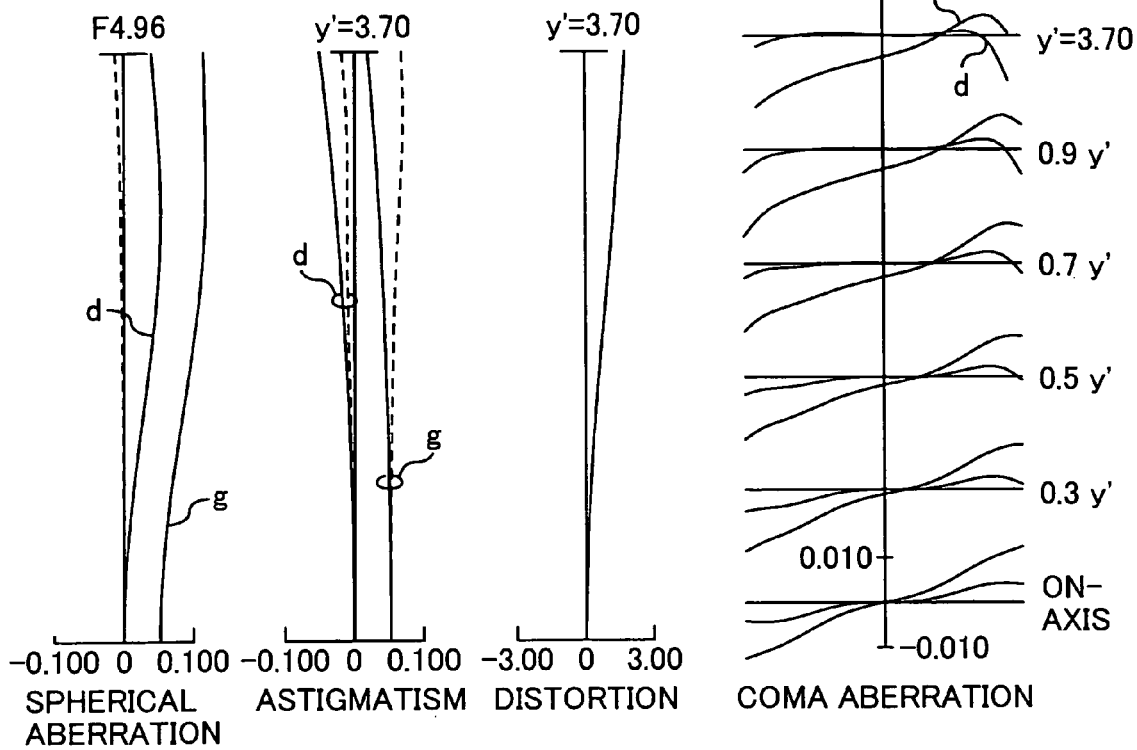
FIG. 13 is a view showing aberrations at a telephoto end of the third embodiment.

FIG. 3 shows the lens group arrangements of the wide angle end, intermediate focal length and telephoto end of a zoom lens according to the third embodiment as illustrated in FIG. 1. In addition, FIGS. 11, 12, 13 show the aberration diagrams in the short focus end (wide angle end), intermediate focal length and long focus end (telephoto end) of the third embodiment.

Fourth Embodiment
f = 4.74-21.53, F = 3.44-5.03, ω = 39.15-9.57

| Surface No. | R | D | Nd | vd | Remarks |
|---|---|---|---|---|---|
| 01 | 21.750 | 0.90 | 1.92286 | 20.88 | First lens |
| 02 | 13.560 | 4.07 | 1.72342 | 37.99 | Second lens |
| 03 | 134.922 | Variable (A) | | | |
| *04 | 59.812 | 0.79 | 1.83500 | 42.98 | Third lens |
| 05 | 4.406 | 2.04 | | | |
| 06 | 21.026 | 2.18 | 1.76182 | 26.61 | Fourth lens |
| 07 | −8.261 | 0.64 | 1.83500 | 42.98 | Fifth lens |
| *08 | −1778.290 | Variable (B) | | | |
| 09 | Aperture stop | Variable (C) | | | |
| *10 | 7.086 | 2.58 | 1.58913 | 61.25 | Sixth lens |
| *11 | −9.843 | 0.10 | | | |
| 12 | 11.489 | 2.15 | 1.75500 | 52.32 | Seventh lens |
| 13 | −7.050 | 0.80 | 1.68893 | 31.16 | Eighth lens |
| 14 | 4.281 | Variable (D) | | | |
| *15 | 12.000 | 1.87 | 1.58913 | 61.25 | Ninth lens |
| *16 | −54.281 | Variable (E) | | | |
| 17 | ∞ | 0.90 | 1.51680 | 64.20 | Various Filters |
| 18 | ∞ | | | | |

Aspheric Surface: Fourth Surface $K = 0.0$,
$A_4 = 1.80601 \times 10^{-4}, A_6 = -4.15776 \times 10^{-6}$,
$A_8 = 6.07946 \times 10^{-8}, A_{10} = -5.54895 \times 10^{-10}$,
Aspheric Surface: Eighth Surface $K = 0.0$,
$A_4 = -4.65567 \times 10^{-4}, A_6 = -1.01371 \times 10^{-5}$,
$A_8 = -1.76981 \times 10^{-7}, A_{10} = -4.26668 \times 10^{-8}$
Aspheric Surface: Tenth Surface $K = 0.0$,
$A_4 = -8.59157 \times 10^{-4}, A_6 = 1.14866 \times 10^{-6}$,
$A_8 = 4.43235 \times 10^{-7}, A_{10} = -1.52194 \times 10^{-7}$
Aspheric Surface: Eleventh Surface $K = 0.0$,
$A_4 = 3.42627 \times 10^{-4}, A_6 = -8.22671 \times 10^{-6}$,
$A_8 = 1.63733 \times 10^{-6}, A_{10} = -1.97295 \times 10^{-7}$
Aspheric Surface: Fifteenth Surface $K = 0.0$,
$A_4 = 9.64225 \times 10^{-5}, A_6 = -1.02076 \times 10^{-5}$,
$A_8 = -4.40239 \times 10^{-8}, A_{10} = -6.16955 \times 10^{-9}$
Aspheric Surface: Sixteenth Surface $K = 0.0$,
$A_4 = 2.16730 \times 10^{-4}, A_6 = -2.27633 \times 10^{-5}$.

Variable Spacing

| | Short focus end f = 4.741 | Intermediate focal length f = 10.106 | Long focus end f = 21.531 |
|---|---|---|---|
| A | 0.855 | 8.427 | 15.142 |
| B | 8.351 | 2.914 | 1.200 |
| C | 3.052 | 2.948 | 1.000 |
| D | 3.247 | 6.975 | 12.160 |
| E | 2.680 | 2.680 | 2.680 |

A value of parameter in each condition $(N_4 - 1) X_{40} (H_{0.8})/Y'$ max = −0.00060
$\{(N_4 - 1) X_{40} (H_{0.8}) + (1 - N_4) X_{41} (H_{0.8})\}/Y'$ max = 0.00013
$X1/fT = 0.650$
$X3/fT = 0.414$
$|f2|/f3 = 0.813$
$f1/fW = 9.13$
$dsw/fT = 0.142$
$m4T = 0.702$
$m4T/m4W = 1.0$
(the fourth lens group is fixed during changing the magnification)

Figure 4:
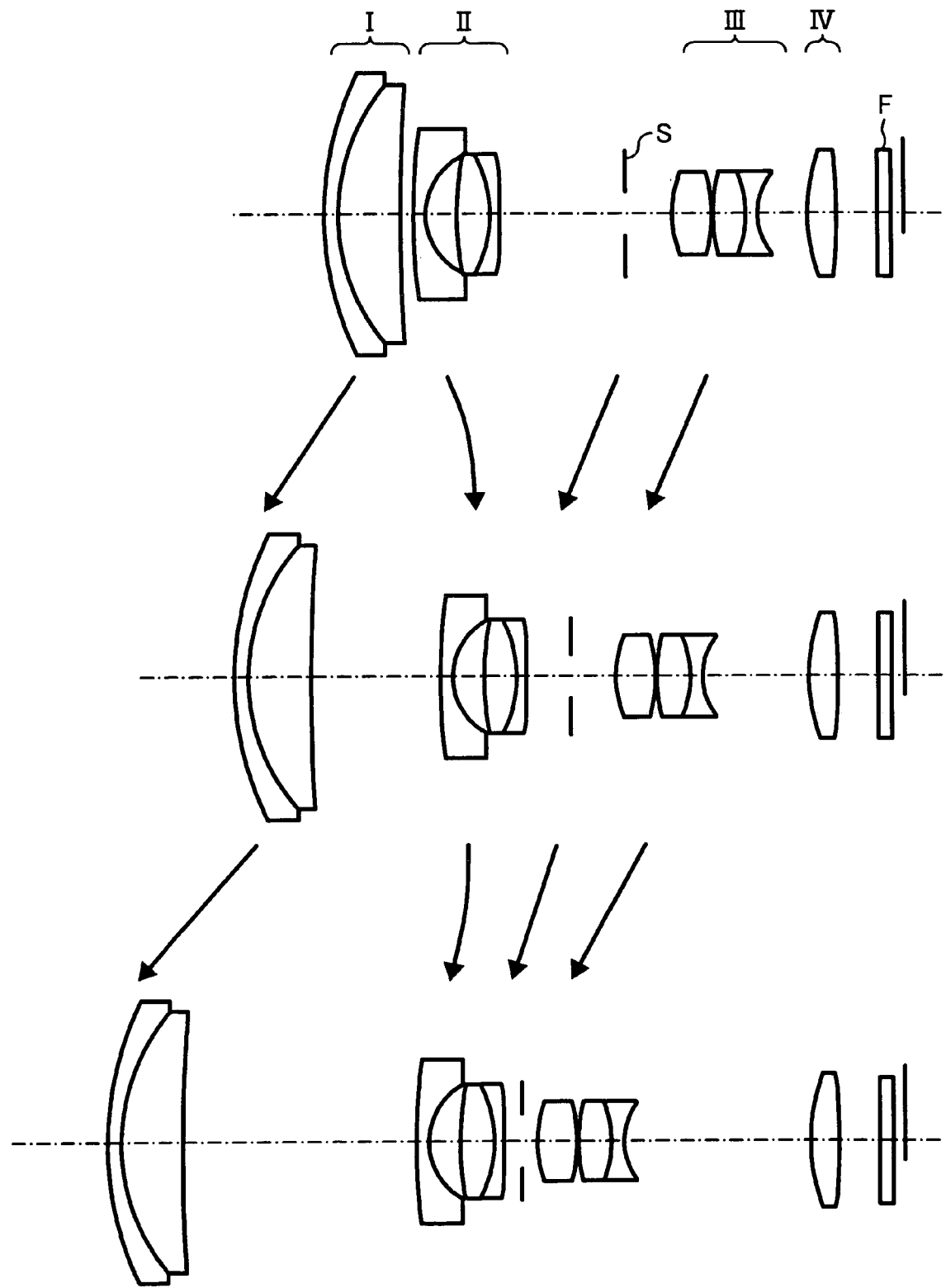
FIG. 4 is a view showing a lens structure and movement of each lens group in a fourth embodiment.
Figure 14:
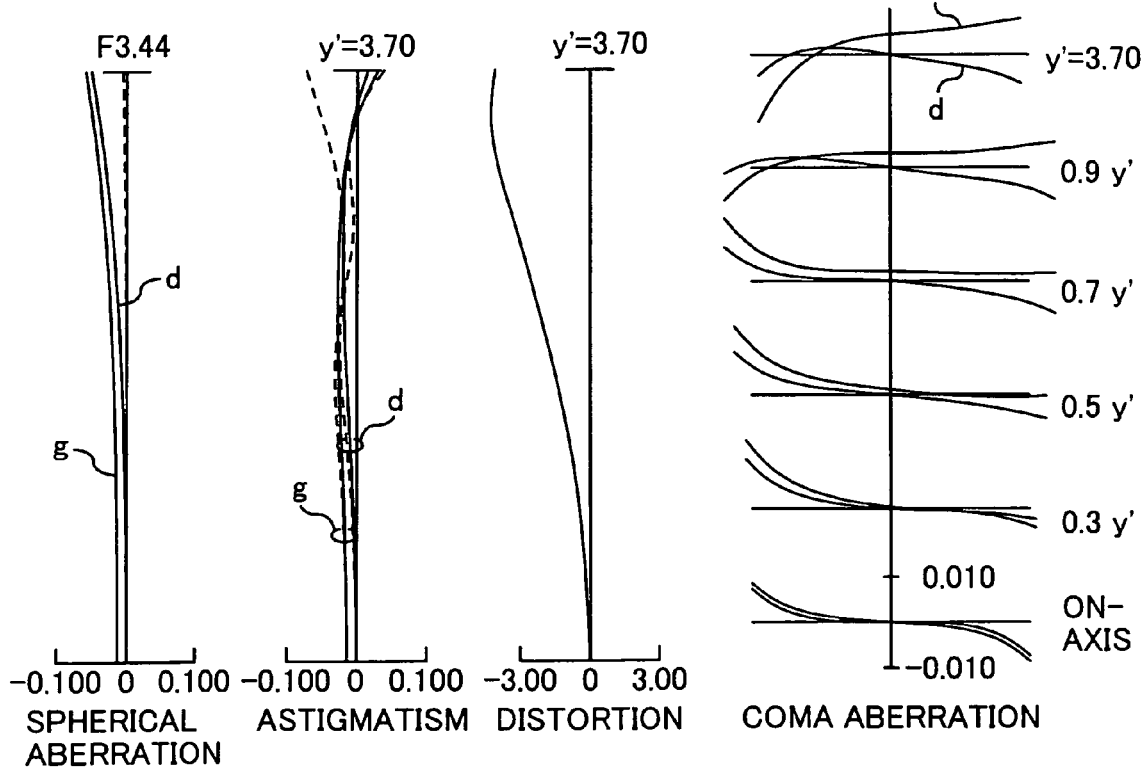
FIG. 14 is a view showing aberrations at a short focus end of the fourth embodiment.
Figure 15:
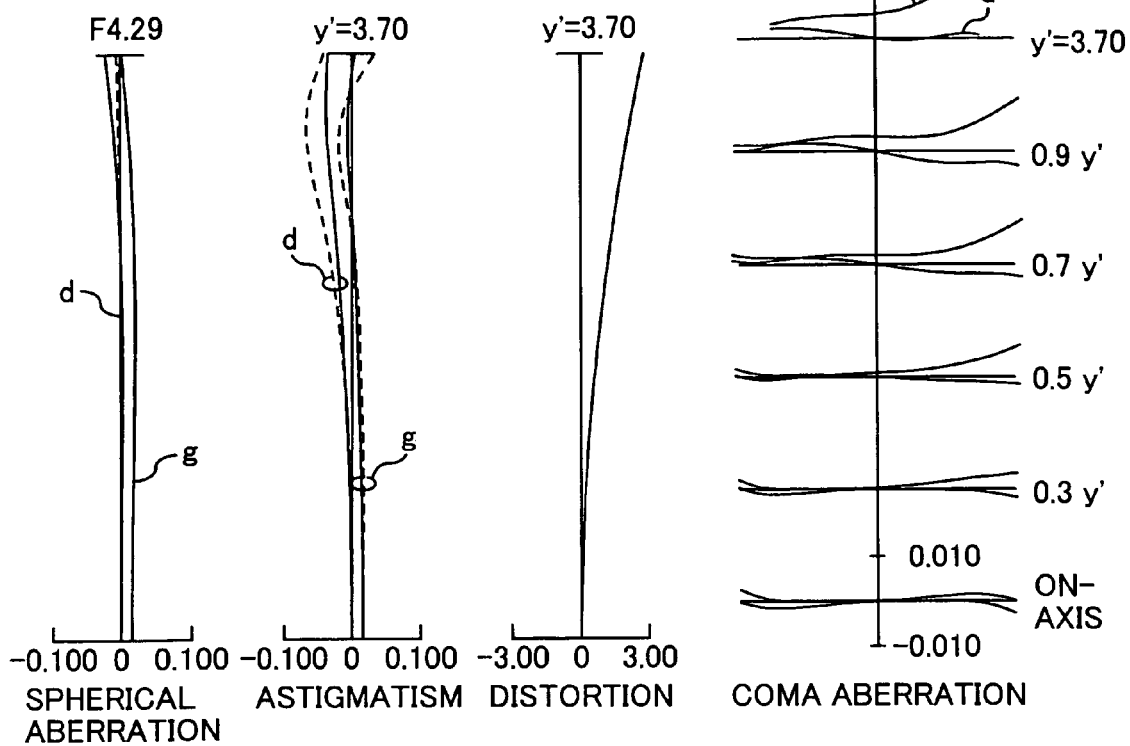
FIG. 15 is a view showing aberrations at an intermediate focal length of the fourth embodiment.
Figure 16:
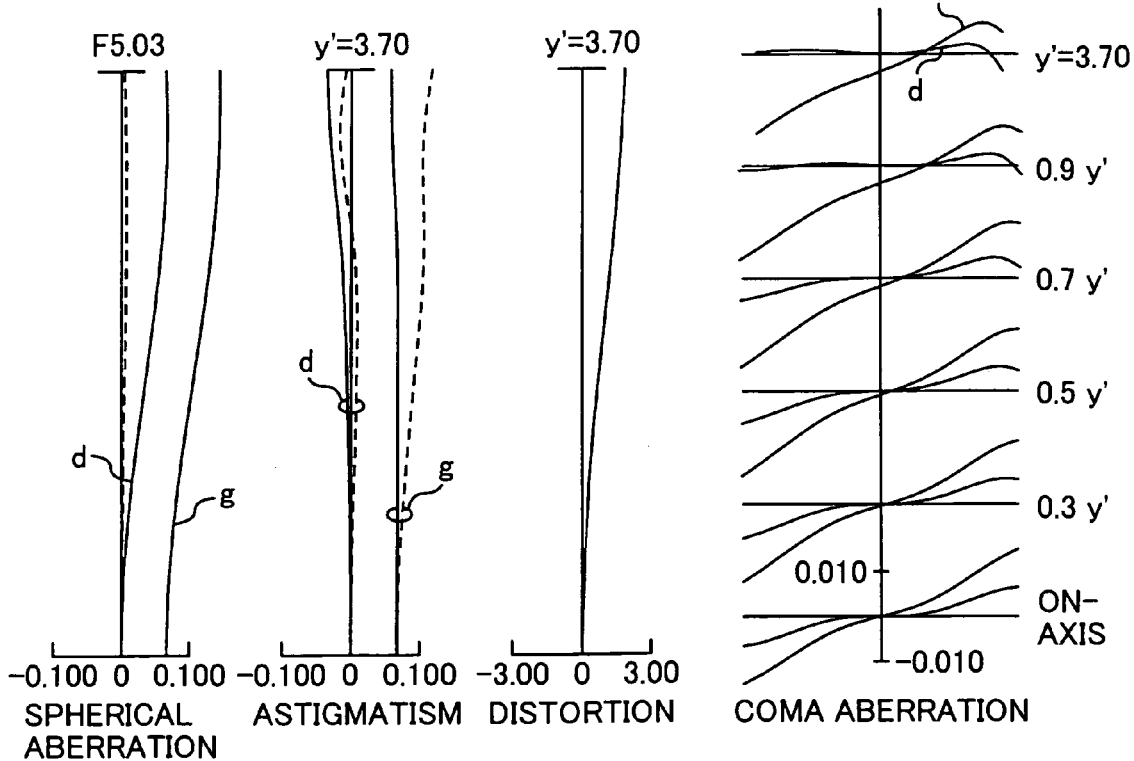
FIG. 16 is a view showing aberrations at a telephoto end of the fourth embodiment.

FIG. 4 shows the lens group arrangements of the wide angle end, intermediate focal length and telephoto end of the zoom lens according to the fourth embodiment as illustrated in FIG. 1. In addition, FIGS. 14, 15, 16 show the aberration diagrams in the short focus end (wide angle end), intermediate focal length and long focus end (telephoto end) of the fourth embodiment.

In addition, in FIGS. 1-4 showing the lens group arrangement of each embodiment, the left side of figure is the object side, a reference number I denotes a first lens group, II denotes a second lens group, S denotes an aperture stop, III denotes a third lens group and IV denotes a fourth lens group.

Next, Embodiment 1 of an information device will be described with reference to FIGS. 17A, 17B, 17C, 18. In this embodiment, the information device is performed as "a personal digital assistance device".

As shown in FIGS. 17A, 17B, 17C, 18, a personal digital assistance device 30 includes a photographing lens 31 and a light receiving element (area sensor) 45 of an image pickup device. In the personal digital assistance device 30, an image of photographing object is imaged onto the light receiving element 45 by the photographing lens 31, and the image is loaded by the light receiving element 45.

The zoom lens described in any one of the after-mentioned FIGS. 1 to 14 is used as the photographing lens 31, more particularly, the zoom lens described in any one of the above first to fourth embodiments is used as the photographing lens 31. In addition, a light receiving element having 4-8 million pixels or more, for example, a CCD area sensor having the opposite angle length of light receiving area, 9.1 mm, the pixel pitch, 2.35 μm and about 7 million pixels, and a CCD area sensor having the opposite angle length of light receiving area, 9.1 mm, the pixel pitch, 2 μm of and about 10 million pixels can be used as the light receiving element 45.

Figure 18:
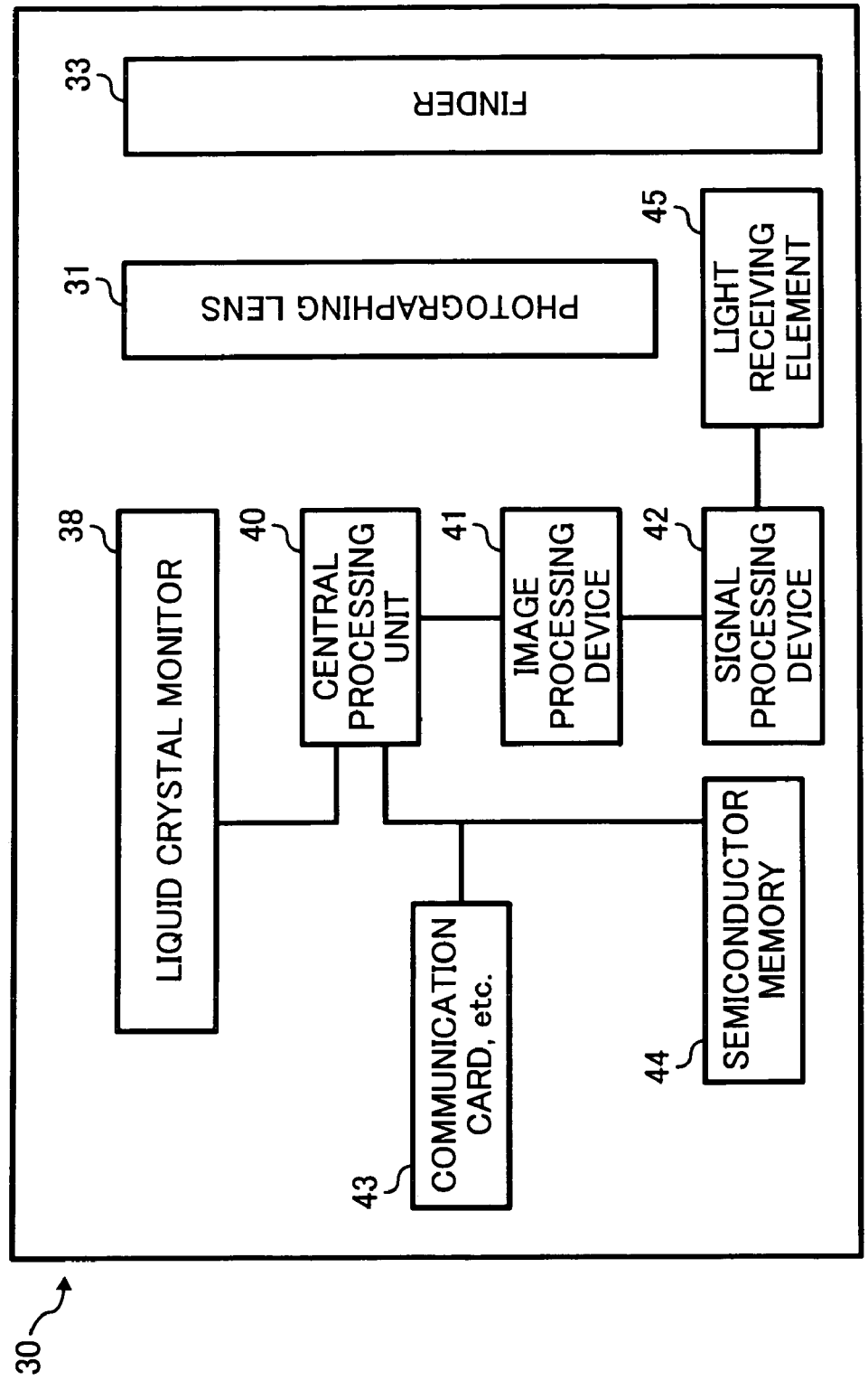
FIG. 18 is a view explaining a system of the information device in FIGS. 17A-17C.

As shown in FIG. 18, the output of the light receiving element 45 is processed by a signal processing device 42, which receives control of a central processing unit 40 to be converted into digital information. The image information digitized by the signal processing device 42 is recorded in a semiconductor memory 44 after receiving a predetermined image process in an image processing device 41, which receives the control of the central processing unit 40. A liquid crystal monitor 38 can display "an image during photographing", and also can display "an image recorded in the semiconductor memory 44". In addition, the image recorded in the semiconductor memory 44 can be sent to the external by using a communication card 43, etc.

Figure 17A:
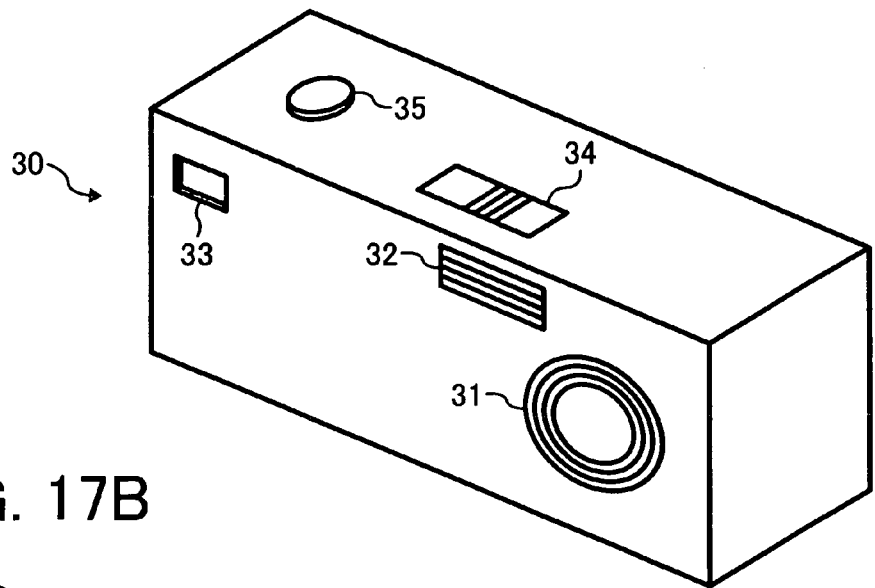
FIG. 17A is a view explaining embodiments 1, 2, 3, 4 of an information device.
Figure 17B:
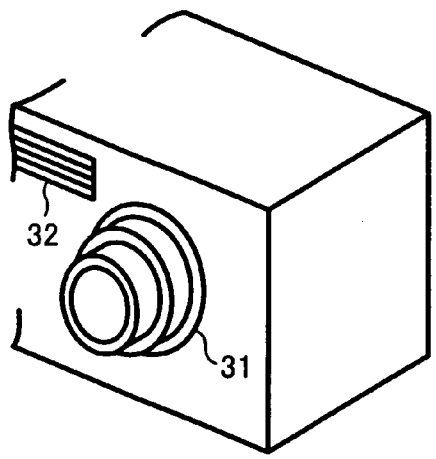
FIG. 17B is a view explaining the embodiments 1, 2, 3 4 of the information device.
Figure 17C:
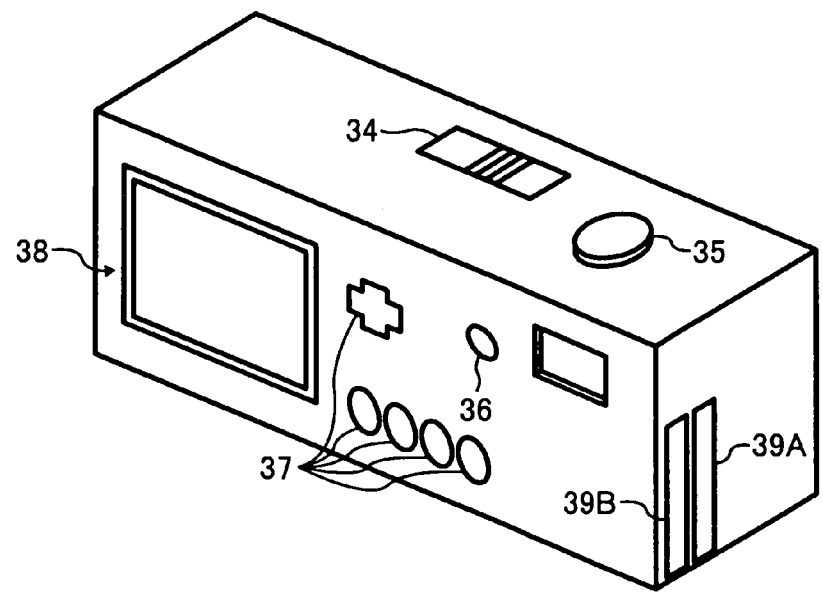
FIG. 17C is a view explaining the embodiments 1, 2, 3, 4 of the information device.

As shown in FIG. 17A, the photographing lens 31 is in "a collapsed state" while the device is being carried. If a user operates a power source switch 36 to turn on the power, a lens barrel is extended as shown in FIG. 17B. At this time, in the interior of lens barrel, each group of the zoom lens is, for example, in "the arrangement of the short focus end", and the arrangement of each group is changed by operating a zoom lever 34, and also the magnification can be changed to the long focus end. At this time, a magnification of a finder 33 is changed in conjunction with the change in the field angle of the photographing lens 31.

The focusing is performed by half-pressing a shutter bottom 35. When using the zoom lens described in the first to fourth embodiments, the focusing can be performed by the movement of the second lens group or the fourth lens group, or the movement of the light receiving element 45. The photographing is performed by further pressing the shutter bottom 35, and then the above processes are conducted.

When displaying the image recorded in the semiconductor memory 44 on the liquid crystal monitor 38 and sending the image to the external by using the communication card 43, etc., operation bottoms 37 are used. The semiconductor memory 44, communication card 43, etc., are inserted into dedicated or general purpose slots 39A, 39B to be used.

In addition, if the photographing lens 31 is a collapsed state, each of the groups in the zoom lens is not always necessary to be lined up on the optical axis. For example, if the zoom lens has a structure that the third lens group is retracted from the optical axis to be stored in parallel with other lens groups, the information device can be further slimed.

The zoom lens described in the first to fourth embodiments can be used as the photographing lens 31 for the above described personal digital assistance device. Accordingly, a small and high quality personal digital assistance device, which has a light receiving element having 4 million pixels to 8 million pixels or more, can be achieved.

Additional Embodiment 1

A zoom lens according to the present invention including, in order from an object side, a first lens group having a positive refracting power, a second lens group having a negative refracting power, a third lens group having a positive refracting power, a fourth lens group having a positive refracting power, and the first lens group being moved to the object side during changing a magnification from a wide angle end to a telephoto end, comprises the following features.

More particularly, the fourth lens group comprises one positive lens, and both surfaces of the positive lens are an aspheric surface, respectively. In addition, total displacement of the first lens group during changing the magnification from the wide angle end to the telephoto end, X1 and a focal length of an entire system at the telephoto end, fT satisfy the following condition: (1) $0.30 < X1/fT < 0.85$.

According to the zoom lens of the present invention, it is preferable for total displacement of the third lens group during changing the magnification from the wide angle end to the telephoto end, X3 and the focal length of the entire system at the telephoto end, fT to satisfy the following condition: (2) $0.15 < X3/fT\ 0.50$.

According to the zoom lens of the present invention, it is preferable for a focal length of the second lens group, f2 and a focal length of the third lens group, f3 to satisfy the following condition: (3) $0.6 < |f2|/f3 < 1.0$.

According to the zoom lens of the present invention, it is preferable for a focal length of the first lens group, f1 and a focal length of the entire system at the wide angle end, fW to satisfy the following condition: (4) $6.0 < f1/fW < 12.0$.

According to the zoom lens of the present invention, it is preferable for Abbe number of the positive lens comprising the fourth lens group, $v_4$ to satisfy the following condition: (5) $50 < v_4 < 75$.

According to the zoom lens of the present invention, only the first lens group can be moved to the object side during changing the magnification from the wide angle end to the telephoto end, and also the first lens group and the third lens group can be moved to the object side during changing the magnification from the wide angle end to the telephoto end.

According to the zoom lens of the present invention, it is preferable for a refractive index of a material, $N_4$, an aspheric surface amount in 80% of a maximum ray effective height in the aspheric surface of the object side, $X_{40}(H_{0.8})$, an aspheric surface amount in 80% of a maximum ray effective height in the aspheric surface of an image side, $X_{41}(H_{0.8})$, and a maximum image height, $Y'_{max}$ of the positive lens comprising the fourth lens group to satisfy the following condition: (6) $-0.0080 < (N_4-1) X_{40}(H_{0.8})/Y'_{max} < 0.0, (7) -0.0010 < \{(N_4-1) X_{40}(H_{0.8}) + (1-N_4) X_{41}(H_{0.8})\} Y'_{max} < 0.0010$.

The above aspheric surface amount (generally, shown as "X(H)") is a difference of "a sag in a height from an optical axis, H" of a spherical surface defined by a paraxial curvature of aspheric surface and an actual aspheric surface, and has the direction from the object side toward the image side as positive.

According to the zoom lens of the present invention, it is preferable for the fourth lens group to position closer to the image side at the telephoto end than the wide angle end.

According to the zoom lens of the present invention, it is preferable for an imaging magnification of the fourth lens group at the telephoto end, m4T to satisfy the following condition: (8) $0.60 < m4T < 0.85$. In this case, it is more preferable for the imaging magnification of the fourth lens group at the telephoto end, m4T and an imaging magnification of the fourth lens group at the wide angle end, m4W to satisfy the following condition: (9) $1.0 < m4T/m4W < 1.3$.

According to the zoom lens of the present invention, the second lens group can not be displaced during changing the magnification. Of course, in the zoom lens of the present invention, during changing the magnification, the fourth lens group can be fixed, and the second lens group can be moved.

According to the zoom lens of the present invention, an aperture stop can be disposed between the second lens group and the third lens group, and the aperture stop can be moved independently of the neighboring lens groups during changing the magnification. In this case, it is preferable for an axial distance between the aperture stop and the surface of the most object side of the third lens group at the wide angle end, dsw to satisfy the following condition: (10) $0.08 < dsw/fT < 0.20$. Moreover, in the zoom lens according to the present invention, it is preferable for an interval between the aperture stop and the third lens group to increase at the wide angle end than the telephoto end.

According to an information device comprising a photographing function of the present invention, the above zoom lens can be used as an optical system for photographing. According to the information device of the present invention, an object image by the zoom lens can be imaged on a light receiving surface of an image pickup device. In this case, the number of pixels of the image pickup device can be 4 million to 8 million pixels or more.

As described above, the information device can be performed as a digital camera, video camera, a silver salt camera and the like, and also can be preferably performed as a personal digital assistance device.

Filling in the details, generally, the zoom lens comprising the four lens groups having the arrangement of positive, negative, positive and positive refracting power according to the present invention is constructed as a so-called variator that the second lens group bears a major changing magnification function. With such a zoom lens, it becomes extremely difficult to correct the aberration in accordance with the wider field angle and larger changing magnification of the zoom lens. However, in the present invention, the third lens group shares the changing magnification function to reduce the burden of the second lens group. Accordingly, the flexibility of the aberration correction is secured, and the wider filed angle and the larger changing magnification can be achieved.

In addition, during changing the magnification from the wide angle end to the telephoto end, the first lens group is significantly moved to the object side, more particularly, the first lens group is positioned closer to the image side at the wide angle end than the telephoto end. Thereby, "the height of ray passing the first lens group at the wide angle end" is reduced, and the first lens group, which grows in size by the wide filed angle, is controlled, and also a large interval between the first lens group and the second lens group is secured at the telephoto end to achieve a long focal point.

During changing the magnification from the wide filed angle to the telephoto end, the interval between the first lens group and the second lens group increases, the interval between the second lens group and the third lens group reduces, the magnifications of both of the second lens group and the third lens group increases, and the second lens group and the third lens group share the changing magnification function each other.

In the zoom lens according to the present invention, the fourth lens group comprises one positive lens, and both surfaces of the lens are an aspheric surface, respectively.

The minimum number of lenses comprising the fourth lens group contributes to the downsizing of lens system in a large way. The off-axis aberration can be sophisticatedly balanced over the entire zooming area by adopting the aspheric surface on both surfaces of the fourth lens group comprising one positive lens, compared with a spherical surface on both surfaces, or an aspheric surface on one surface. Thereby, the wider field angle and larger changing magnification can be easily achieved.

The condition (1) controls the total displacement of the first lens group during changing the magnification from the wide angle end to the telephoto end, X1, and is important with respect to the wide filed angle and long focal point.

If the parameter, X1/fT becomes lower, the displacement of the first lens group is reduced, and if the parameter becomes lower than the lower limit value of 0.30, the contribution to the changing magnification of the second lens group decreases. Accordingly, the share of the third lens group increases, and also the refracting power of the first lens group and the second lens group have to be strengthened, resulting in the deterioration in various aberrations in either case. In addition, the entire length of the lens at the wide angle end is increased in length, and the height of ray passing the first lens group increases, causing the growing in size of the first lens group.

If the parameter, X1/fT becomes larger than the upper limit value of 0.85, the displacement of the first lens group excessively increases. Accordingly, the entire length at the wide angle end becomes too short, or the entire length at the telephoto end becomes too long. If the entire length at the wide angle end becomes too short, the moving space of the third lens group is limited, and the contribution to the changing magnification of the third lens group is reduced. Therefore, it becomes difficult to correct the entire aberrations. If the entire length at the telephoto end becomes too long, the downsizing in the entire length direction is disturbed, the radial direction grows in size for securing the light volume around the telephoto end, and also the image performance is easily deteriorated by the manufacturing error such as the falling of lens barrel.

It is more preferable for the parameter, X1/fT to satisfy the following condition:

$$0.40 < X1/fT < 0.75. \quad (1A)$$

The condition (2) controls the displacement of the third lens group. If the parameter, X3/fT becomes lower than the lower limit value of 0.15, the displacement of the third lens group with the changing magnification becomes insufficient. Accordingly, the burden of the second lens group is increased by the reduced the contribution to the changing magnification of the third lens group, and also the refracting power of the third lens group has to be strengthened, resulting in the deterioration in various aberrations.

If the parameter, X3/fT becomes larger than the upper limit of 0.50, the entire length of lens at the wide angle end lengthens, and the height of ray passing the first lens group increases, causing in the growing in size of the first lens group.

It is more preferable for the parameter, X3/fT to satisfy the following condition:

$$0.20 < X3/fT < 0.45. \quad (2A)$$

The conditions (3), (4) are preferable for favorably correcting the aberration.

If the parameter of the condition (3), |f2|/f3 becomes lower than 0.6, the refracting power of the second lens group becomes too strong with respect to the refracting power of the third lens group, on the other hand, if the parameter, |f2|/f3 becomes larger than 1.0, the refracting power of the third lens group becomes too strong with respect to the refracting power of the second lens group. Therefore, the aberration fluctuation during changing the magnification easily increases out of the condition (3)'s range.

If the parameter of condition (4), f1/fW becomes lower than 6.0, it is advantageous to the larger changing magnification because the imaging magnification of the second lens group comes close to the same magnification, and the changing magnification efficiency increases. However, the large refracting power is required for each lens in the first lens group, and the negative effect such as the deterioration in the chromatic aberration especially at the telephoto end is easily produced. In addition, the first lens group is increased in the thickness and diameter, and especially, it is disadvantageous to the downsizing in a collapsed state.

If the parameter, f1/fW becomes larger than the upper limit value of 12.0, the contribution to the changing magnification of the second lens group is reduced, and it becomes difficult to obtain the larger changing magnification.

The condition (5) relates to chromatic aberration. If the Abbe number of the positive lens comprising the fourth lens group, $v_4$ is smaller than 50, the chromatic aberration, which is generated in the fourth lens group, becomes too big. Thereby, it becomes difficult to balance the on-axis chromatic aberration and the magnification chromatic aberration over the entire zooming area. In addition, when the focusing is performed to the object of finite distance by moving the fourth lens group, the fluctuation of the chromatic aberration by the focusing is increased. On the other hand, if $v_4$ is larger than 75, it is advantageous to the correction of chromatic aberration, but it is not preferable because material is expensive and also the processing of aspheric surface to both surfaces is difficult.

In addition, it is more preferable for the Abbe number of the positive lens comprising the fourth lens group, $v_4$ to satisfy the following condition: (5A) $50 < v_4 < 65$.

The positive lens comprising the fourth lens group can be made of plastic. The plastic material, which satisfies the above conditions (5), (5A), includes polyolefin series resin, which is represented by ZEONEX (trade name) of ZEON Corporation.

The conditions (6), (7) control the aspheric surface amount of both surfaces of the positive lens comprising the fourth lens group.

More particularly, it is desirable for the object side surface of the positive lens comprising the fourth lens group to be the aspheric surface having a shape that the positive refracting power reduces as turning from the optical axis at least in the portion of 80% or more of the effective height of the maximum ray. It is also desirable for the image side surface to be the aspheric surface having a shape that the positive refracting power increases as turning from the optical axis at least in the portion of 80% or more of the effective height of the maximum ray.

If the parameter of condition (6), $(N_4-1) X_{40} (H_{0.8})/Y'_{max}$ becomes smaller than the lower limit value of $-0.0080$, the aspheric surface amount in the neighboring area of the fourth lens group becomes too big. Thereby, for example, when changing the height of ray passing the fourth lens group in accordance with the focusing, the fluctuation of aberration increases. Accordingly, it becomes difficult to secure the performance with respect to the object at the short range.

The parameter, $(N_4-1) X_{40} (H_{0.8})/Y'_{max}$ becomes larger than the upper limit value 0.0, the aspheric surface amount in the neighboring portion becomes insufficient of the fourth lens group. Thereby, it becomes difficult to correct the aberration by using the features of the aspheric surface in the neighboring portion.

If the parameter of condition (7), $\{(N_4-1) X_{40} (H_{0.8})+(1-N_4) X_{41} (H_{0.8})\}/Y'_{max}$ is smaller than the lower limit value of $-0.0010$, the positive refracting power becomes too weak in the neighboring portion of the fourth lens group. Thereby, the defects that the image surface falls in the pulse direction and the distortion at the wide angle end becomes a cone shape are easily occurred. On the other hand, if the parameter, $\{(N_4-1) X_{40} (H_{0.8})+(1-N_4) X_{41} (H_{0.8})\}/Y'_{max}$ becomes larger than the upper limit value of 0.001, the positive refracting power in the neighboring portion of the fourth lens group becomes too strong. Thereby, the image surface falls in the minus direction, and also the distortion at the wide angle end increases at minus (barrel shape).

As described above, if the fourth lens group is moved so as to position closer to the image side at the telephoto end than the wide angle end, the luminous flux passes the neighboring portion of the fourth lens group at the telephoto end than the wide angle end. Accordingly, the flexibility of new design can be obtained by the different effect of the aspheric surface between the wide angle end and the telephoto end. In addition, during changing the magnification from the wide angle end to the telephoto end, the magnification of the fourth lens group increases, and the fourth lens group can share the changing magnification function. Therefore, the magnification can be effectively changed in a limited space.

The condition (8) enables more sufficient aberration correction can be achieved with the achievement of target wider filed angle and larger changing magnification by combining with the structure that the fourth lens group is moved so as to position closer to the image side at the telephoto end than the wide angle end.

If the parameter, m4T becomes lower than the lower limit value of 0.60 of the condition (8), the luminous flux emitting to the third lens group approaches the afocal. Thereby, the share of the changing magnification of the second lens group increases because the third lens group can not effectively conduct the changing magnification. Accordingly, it becomes difficult to correct the field curvature and astigmatism, which increase with the wider filed angle. If the parameter, m4T becomes large over the upper limit value of 0.85, the fourth lens group becomes too close to the image surface. Thereby, the required back-focus can not secured, or the refracting power of the fourth lens group becomes too small.

If the refracting power of the fourth lens group becomes too small, the exit pupil approaches the image surface, and the ray incidence angle to the neighboring portion of the light-receiving element increases. Therefore, the shortage of light volume in the neighboring portion is easily caused.

It is more preferable for the parameter of condition (8), m4T to satisfy the following condition: (8A) $0.65<m4T<0.80$.

The condition (9) relates to the change in the magnification of the fourth lens group during changing the magnification from the wide angle end to the telephoto end. If the parameter, m4T/m4W becomes smaller than the lower limit value of 1.0, the fourth lens group does not contribute to the changing magnification. Thereby, the share of the changing magnification of the second lens group and third lens group increases, and it becomes difficult to balance the image surface during changing the magnification. On the other hand, if the parameter, m4/m4W becomes larger than the upper limit value of 1.3, the share of the changing magnification of the fourth lens group becomes too large. Thereby, it becomes difficult to correct the aberrations with the simple structure that the fourth lens group comprises one positive lens.

It is more preferable for the parameter of the condition (9), m4T/m4W to satisfy the following condition: (9A) $1.05<m4T/m4W<1.2$.

As described above, in the zoom lens according to the present invention, the aperture stop can be arranged between the second lens group and the third lens group, and during changing the magnification, the aperture stop can be moved independently of the neighboring lens groups (the second and third lens groups).

With this structure, the most suitable ray path can be selected in any position of the large changing magnification area of 4.5 times or more. Accordingly, the flexibility of correction such as, especially, coma aberration and field curvature can be improved, and also the off-axis performance can be improved.

It is preferable for the interval between the aperture stop and the third lens group to be wider at the wide angle end than the telephoto end. The aperture stop approaches the first lens group to reduce the height of ray passing the first lens group by widening the interval between the aperture stop and the third lens group at the wide angle end. Therefore, the first lens group is further downsized.

The condition (10) controls the size of the interval between the aperture stop and the third lens group at the wide angle end, dsw. If the parameter, dsw/fT becomes lower than the lower limit value of 0.08, the aperture stop becomes too close to the third lens at the wide angle filed. Thereby, the height of ray passing the first lens group is excessively increased, causing the growing in size of the first lens group. In addition, it becomes difficult to balance the aberration in the changing magnification area, and it becomes disadvantageous regarding the ensuring of the off-axis performance.

On the other hand, if the parameter, dsw/fT becomes larger than the upper limit value of 0.20, the interval between the aperture stop and the third lens group in excessively increased at the wide angle end, and the height of ray passing the third lens group at the wide angle end is excessively increased. Thereby, the image surface falls to the over side, and the barreled distortion becomes too large. Therefore, it becomes difficult to secure the performance especially at the wide angle end.

It is preferable for the interval between the aperture stop and the third lens group to be the widest at the wide angle end and to be the narrowest at the telephoto end.

If the interval between the aperture stop and the third lens group becomes the widest except at the wide angle end, the height of ray passing the third lens group becomes the largest at the position. Therefore, it becomes difficult to balance the off-axis aberration over the entire changing magnification area. In addition, if the interval between the aperture stop and the third lens group becomes the narrowest except at the telephoto end, the interval between the second lens group and the third lens group can not be sufficiently reduced at the telephoto end. Thereby, the contribution to the changing magnification of the third lend group is reduced. Accordingly, it becomes difficult to correct the entire aberrations.

As described above, the meanings of the structures and the conditions of the zoom lens according to the present invention were explained. Hereinafter, explanations will be given for conditions which enable more preferable aberration correction without disturbing the downsizing of zoom lens of the present invention.

It is preferable for the second lens group to comprise three lenses, in order from the object side, a negative lens having a large curvature surface on the image side, a positive lens having a large curvature surface on the image side and a negative lens having a large curvature surface on the object side.

As a changing magnification group having a negative refracting power, there has been well known an arrangement having a negative lens, negative lens and positive lens in order from the object side when the changing magnification group comprises three lenses. However, compared with this structure, the above structure is superior to the correction performance of the chromatic aberration of magnification with the wider filed angle. In addition, the second lens (positive lens having a large curvature on the image side) and the third lens (positive lens having a large curvature on the image side) from the object side may be cemented.

It is preferable for each lens of the second lens group comprising the negative lens, positive lens and negative lens that the refractive index and the Abbe number of the material satisfy the following conditions.

$1.75 < N21 < 1.90, 35 < v21 < 50$ $1.65 < N22 < 1.90, 20 < v22 < 35$ $1.75 < N23 < 1.90, 35 < v23 < 50.$

Where, N2i is a refractive index of ith lens in the second lens group counted from the object side and v2i is Abbe number of ith lens in the second lens group counted from the object side. The chromatic aberration can be more preferably corrected by selecting such a lens material. The above conditions are satisfied in the above each embodiment.

It is preferable for the first lens group to comprise at least one negative lens and at least one positive lens in order from the object side. More particularly, it is preferable for the first lens group to comprise two lenses including, in order from the object side, a negative meniscus lens having a convex surface on the object side and the positive lens having a strong convex surface on the object side (the second and fourth embodiments), or three lenses including, in order from the object side, a negative meniscus lens having a convex surface on the object side, a positive lens having a strong convex surface on the object side and a positive lens having a strong convex surface on the object side (the first and third embodiments).

It is preferable for the third lens group to comprise three lenses having a positive lens, positive lens and negative lens, in order from the object side. In this case, the second lens and the third lens from the object side may be cemented (the first to fourth embodiments).

When focusing to a finite distance, it is better to use a method, which moves only the fourth lens group, because of the minimum mass to be moved. The fourth lens group has small displacement during changing the magnification, and has a merit which can share the moving mechanism for the changing magnification and the focusing.

In order to advance the downsizing while maintaining the preferable aberration correction, it is effective to use an aspheric surface in addition to both surfaces of the fourth lens group. It is preferable for at least the second lens group and the third lens group to have one aspheric surface or more, respectively. Especially, if an aspheric surface is used for both of the most object side surface and the most image side surface in the second lens group, the distortion, astigmatism, etc., which are liable to increase with the wider field angle, are effectively corrected.

As the aspheric surface lens, molded optical glass and molded optical plastic (glass mold aspheric surface and plastic mold aspheric lens), an aspheric surface that a thin resin layer is molded on a glass lens (i.e., hybrid aspheric surface and replica aspheric surface) and the like are used.

In order to simplify the mechanism, it is better for the opening diameter of the aperture stop to be constant regardless of the changing magnification. However, the change in F number with the changing magnification can be reduced by increasing the opening diameter of the long focal point end with respect to the short focal point end. In addition, if it is necessary to reduce the light volume, which reaches the image surface, the diameter of aperture stop can be reduced. However, it is preferable to insert a ND filter and the like without significantly changing the diameter of aperture stop so as to reduce the light volume because the resolution deteriorated by a diffraction phenomenon can be prevented.

Hereinafter, fifth to eighth embodiments of a zoom lens according to the present invention will be specifically described.

In the fifth to eighth embodiments, the maximum image height is 3.70 mm.

In each of the embodiments, "various filters (F in FIGS. 19 to 22)" arranged in an image surface side of a fourth lens group can be various filters such as an optical lowpass filter and infrared protection filter, and "a cover glass (seal glass)" of an image pickup device such as a CCD sensor.

A unit expressing a length is mm unless it is specifically mentioned. The eighth embodiment shows an example that "a fourth lens group is fixed during changing a magnification". In the other embodiments, a second lens group is fixed during changing a magnification. In addition, the displacement of the second lens group can be monotonically moved to the image side from the wide angle end toward telephoto end, and also the second lens group is displaced such that the movement locus during changing the magnification represents a curved line having a convex on the image side as shown in the fourth embodiment.

The material of lenses is all optical glass except that a tenth lens in the fifth to seventh embodiment (fourth lens group) is optical plastic. In each of the embodiments, aberrations are sufficiently corrected, and the lens can be applied to a light receiving element having 4 million pixels to 8 million pixels or more.

Meanings of sings in the embodiments are as follows.
f: focal length of entire system
F: F-number
ω: half field angle
R: radius of curvature (paraxial radius of curvature in aspheric surface)
D: surface separation
Nd: refractive index
vd: Abbe number
K: cone constant of aspheric surface
$A_4$: $4^{th}$ aspheric surface coefficient $A_6$: $6^{th}$ aspheric surface coefficient
$A_8$: $8^{th}$ aspheric surface coefficient
$A_{10}$: $10^{th}$ aspheric surface coefficient
$A_{12}$: $12^{th}$ aspheric surface coefficient
$A_{14}$: $14^{th}$ aspheric surface coefficient
$A_{16}$: $16^{th}$ aspheric surface coefficient
$A_{18}$: $18^{th}$ aspheric surface coefficient The aspheric surface shape is expressed by the following equation using an inverse number of paraxial curvature radius (paraxial curvature), C, a height from an optical axis, H, a cone constant number, K, and an aspheric surface coefficient of each of the above degrees, and adopting the aspheric surface amount in the optical axis direction as X.

$$X = CH^2/[1+\sqrt{\{1-(1+K)C^2H^2\}}]+A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}.$$

The shape is specified by providing a paraxial curvature radius, cone constant number and aspheric surface coefficient.

Figure 19:
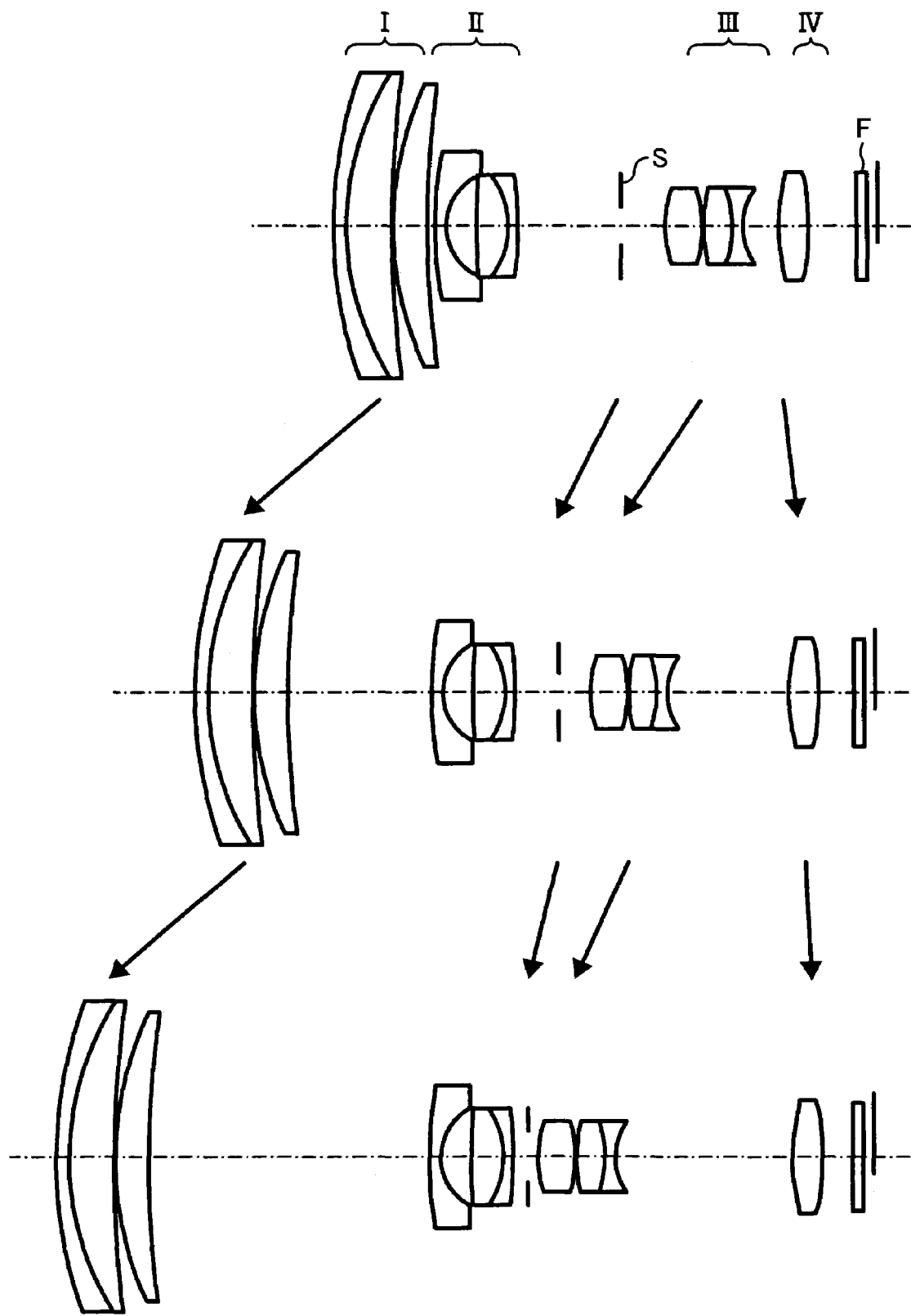
FIG. 19 is a view showing a lens structure and movement of each lens group of a fifth embodiment.

The fifth embodiment is an embodiment of a zoom lens set forth in the after mentioned FIG. 19.

Fifth Embodiment
f = 4.74-32.01, F = 3.46-4.95, ω = 39.16-6.49

| Surface No. | R | D | Nd | vd | Remarks |
|---|---|---|---|---|---|
| 01 | 42.223 | 1.00 | 1.92286 | 18.90 | First lens |
| 02 | 28.025 | 3.30 | 1.77250 | 49.60 | Second lens |
| 03 | 264.302 | 0.10 | | | |
| 04 | 22.135 | 2.50 | 1.49700 | 81.60 | Third lens |
| 05 | 42.390 | Variable (A) | | | |
| 06* | 51.753 | 0.84 | 1.80400 | 46.60 | Fourth lens |
| 07 | 4.276 | 1.97 | | | |
| 08 | 20.494 | 2.45 | 1.76182 | 26.50 | Fifth lens |
| 09 | −7.343 | 0.74 | 1.83481 | 42.70 | Sixth lens |
| 10* | 89.740 | Variable (B) | | | |
| 11 | Aperture stop | Variable (C) | | | |
| 12* | 8.333 | 3.11 | 1.58913 | 61.15 | Seventh lens |
| 13* | −10.000 | 0.10 | | | |
| 14 | 13.011 | 2.51 | 1.80400 | 46.60 | Eighth lens |
| 15 | −6.835 | 0.80 | 1.71736 | 29.50 | Ninth lens |
| 16 | 5.073 | Variable (D) | | | |
| 17* | 12.500 | 2.11 | 1.52470 | 56.20 | Tenth lens |
| 18 | −35.588 | Variable (E) | | | |
| 19 | ∞ | 0.90 | 1.51680 | 64.20 | Various filters |
| 20 | ∞ | | | | |

In the above table, a sign, * denotes an aspheric surface, it is the same as other embodiments.

Aspheric Surface: Sixth Surface

K = 0.0,
$A_4 = 9.28299 \times 10^{-5}, A_6 = 1.03850 \times 10^{-5}$,
$A_8 = -2.16446 \times 10^{-6}, A_{10} = 1.61294 \times 10^{-7}$,
$A_{12} = -5.11846 \times 10^{-9}, A_{14} = 2.47510 \times 10^{-11}$,
$A_{16} = 2.09438 \times 10^{-12}, A_{18} = -3.35049 \times 10^{-14}$ Aspheric Surface: Tenth Surface K = 0.0,
$A_4 = -5.36621 \times 10^{-4}, A_6 = -2.09732 \times 10^{-5}$,
$A_8 = 1.57517 \times 10^{-6}, A_{10} = -1.40290 \times 10^{-7}$ Aspheric Surface: Twelfth Surface K = 0.0,
$A_4 = -5.83958 \times 10^{-4}, A_6 = -2.94644 \times 10^{-6}$,
$A_8 = 1.56092 \times 10^{-6}, A_{10} = -1.29023 \times 10^{-7}$ Aspheric Surface: Thirteenth Surface K = 0.0,
$A_4 = 3.93298 \times 10^{-4}, A_6 = -9.48850 \times 10^{-6}$,
$A_8 = 2.03692 \times 10^{-6}, A_{10} = -1.21118 \times 10^{-7}$, Aspheric Surface: Seventeenth Surface K = 0.0,
$A_4 = -4.62968 \times 10^{-5}, A_6 = 1.18491 \times 10^{-5}$,
$A_8 = -5.99156 \times 10^{-7}, A_{10} = 1.26163 \times 10^{-8}$.

Variable Spacing

| | Short focus end f = 4.737 | Intermediate focal length f = 12.313 | Long focus end f = 32.012 |
|---|---|---|---|
| A | 0.600 | 10.683 | 19.620 |
| B | 6.980 | 3.354 | 1.200 |
| C | 4.302 | 2.750 | 1.000 |
| D | 2.077 | 8.031 | 12.425 |
| E | 3.834 | 3.020 | 2.481 |

A value of parameter in each condition r4F/fw = 2.64
|r3R|/fw = 1.07
X1/fT = 0.591
X3/fT = 0.281
|f2|/f3 = 0.713
f1/fW = 8.55
dsw/fT = 0.134
m4T = 0.725
m4T/m4W = 1.116

Figure 23:
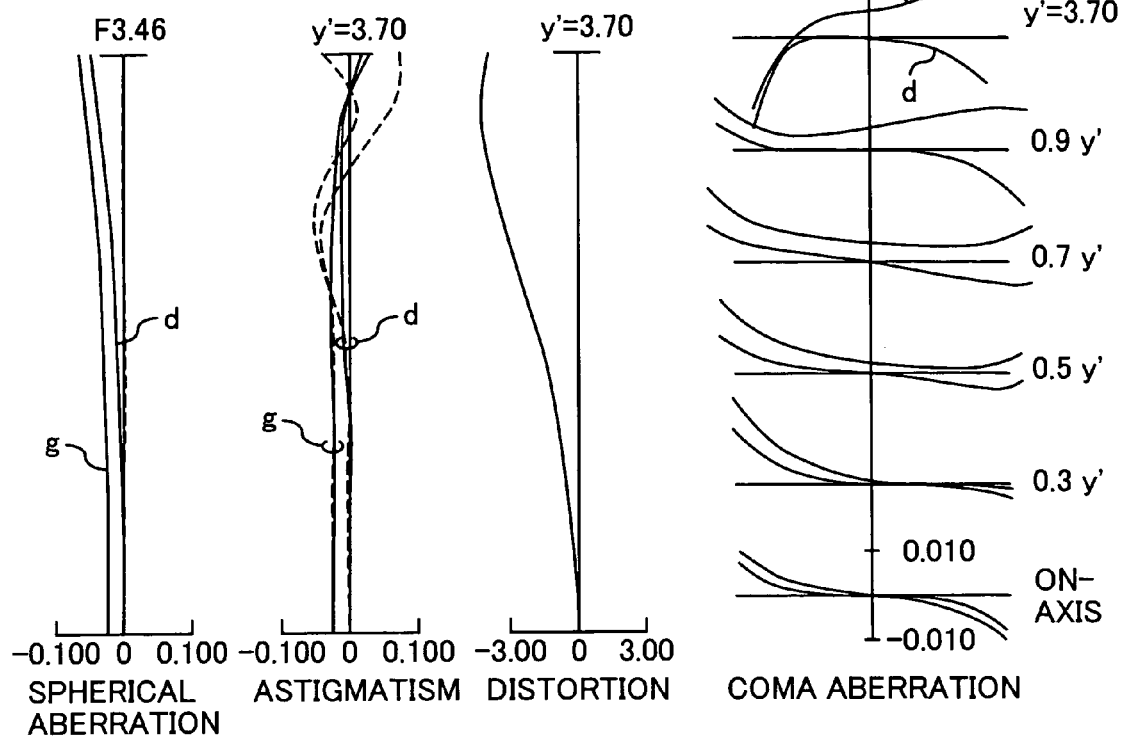
FIG. 23 is a view showing aberration in a short focus end of the fifth embodiment.
Figure 24:
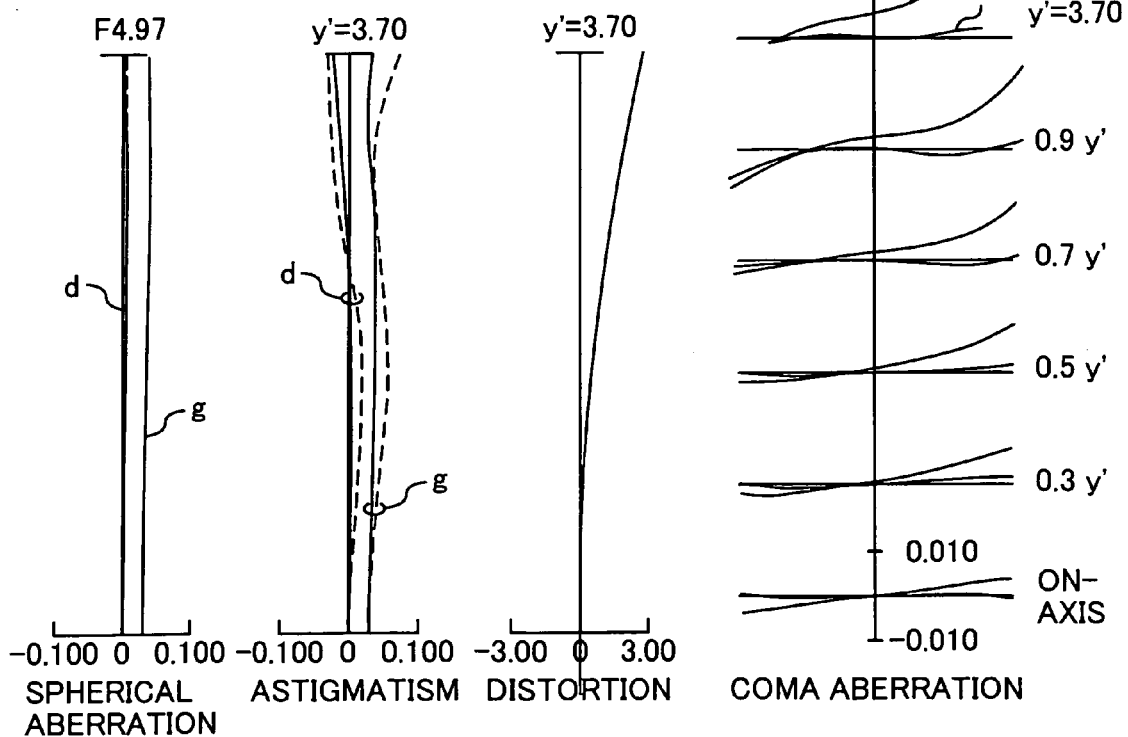
FIG. 24 is a view showing aberration in an intermediate focal length of the fifth embodiment.
Figure 25:
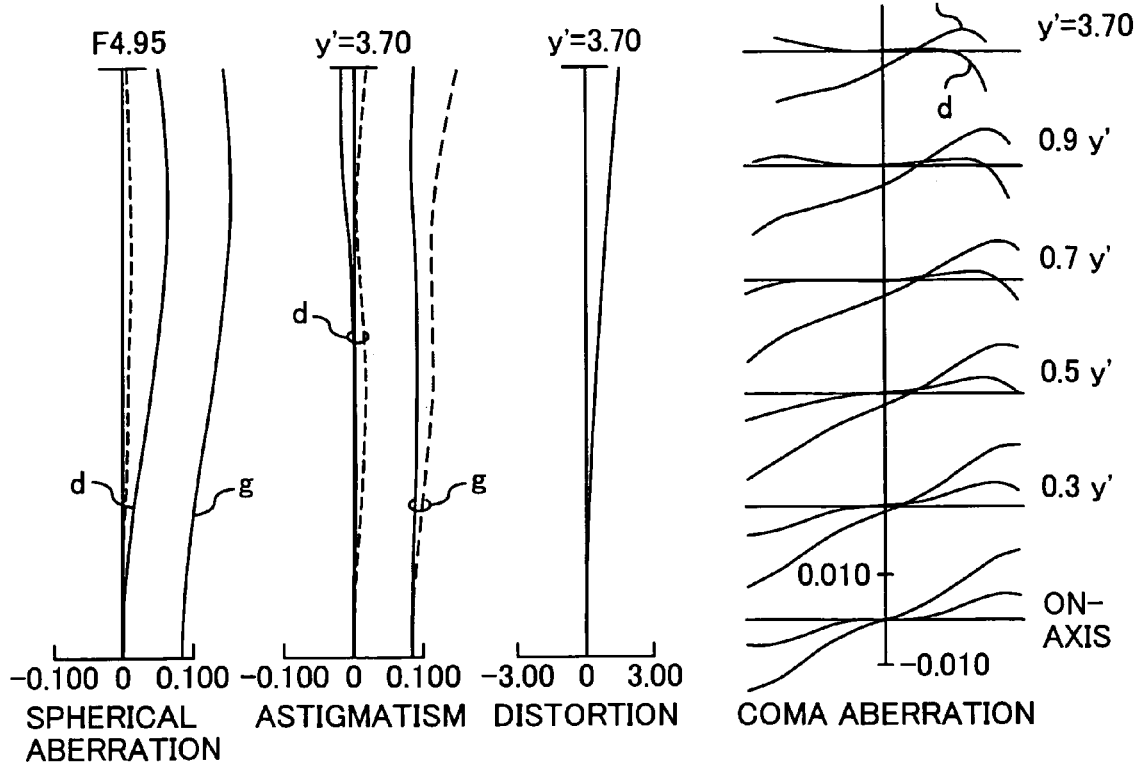
FIG. 25 is a view showing aberration in a long focus end of the fifth embodiment.

FIG. 19 shows the lens group arrangements of the wide angle end (upper diagram), intermediate focal length (middle diagram) and telephoto end (lower diagram) of the zoom lens according to the fifth embodiment. FIGS. 23, 24, 25 show the aberration diagrams in the short focus end (wide angle end), intermediate focal length and long focus end (telephoto end) of the fifth embodiment. In addition, the dashed line in the diagram of spherical aberration shows a sine condition, and the solid line and the dashed line in the diagram of astigmatism show sagittal and meridional, respectively.

Figure 20:
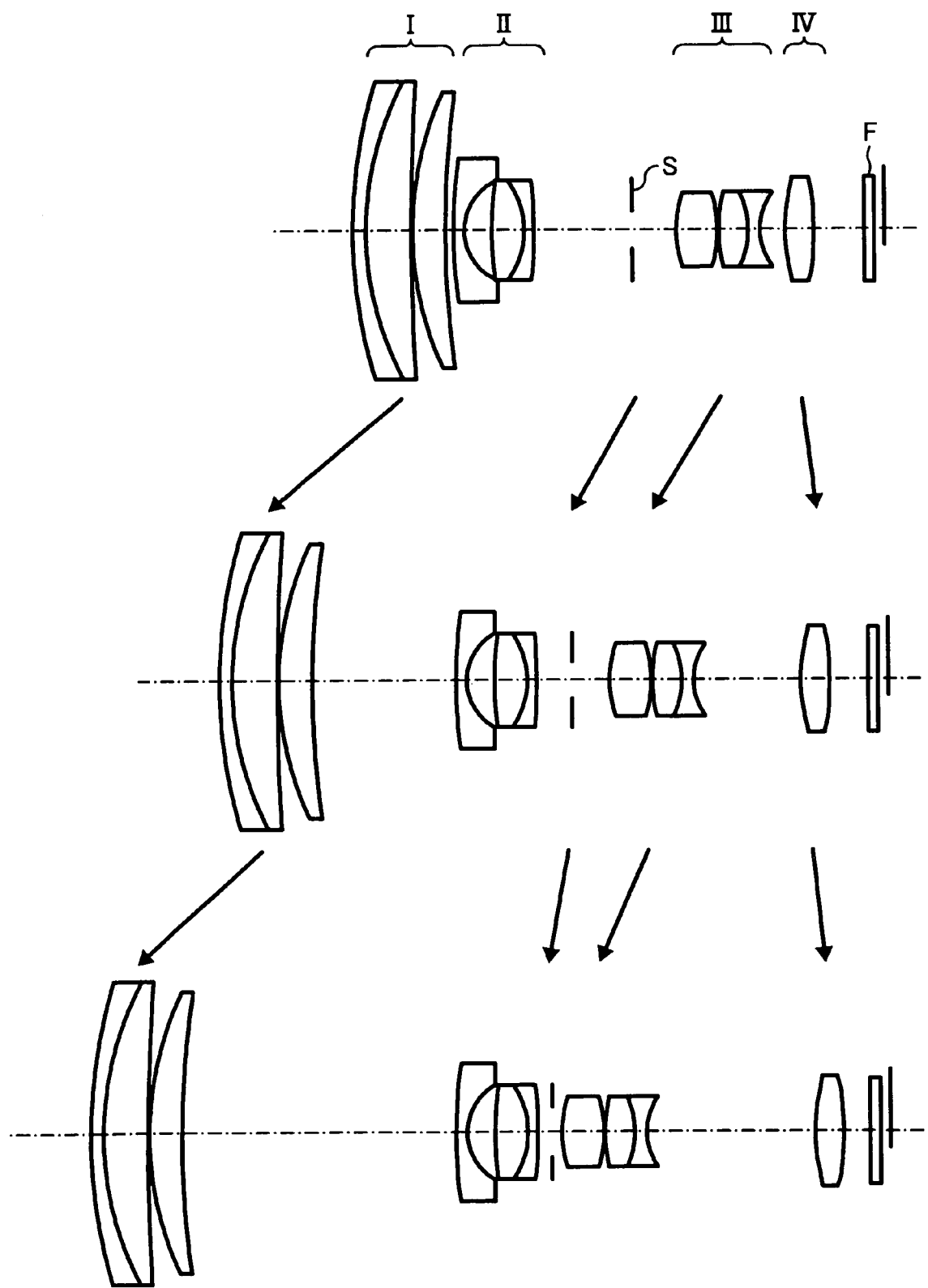
FIG. 20 is a view showing a lens structure and movement of each lens group of a sixth embodiment.
Figure 21:
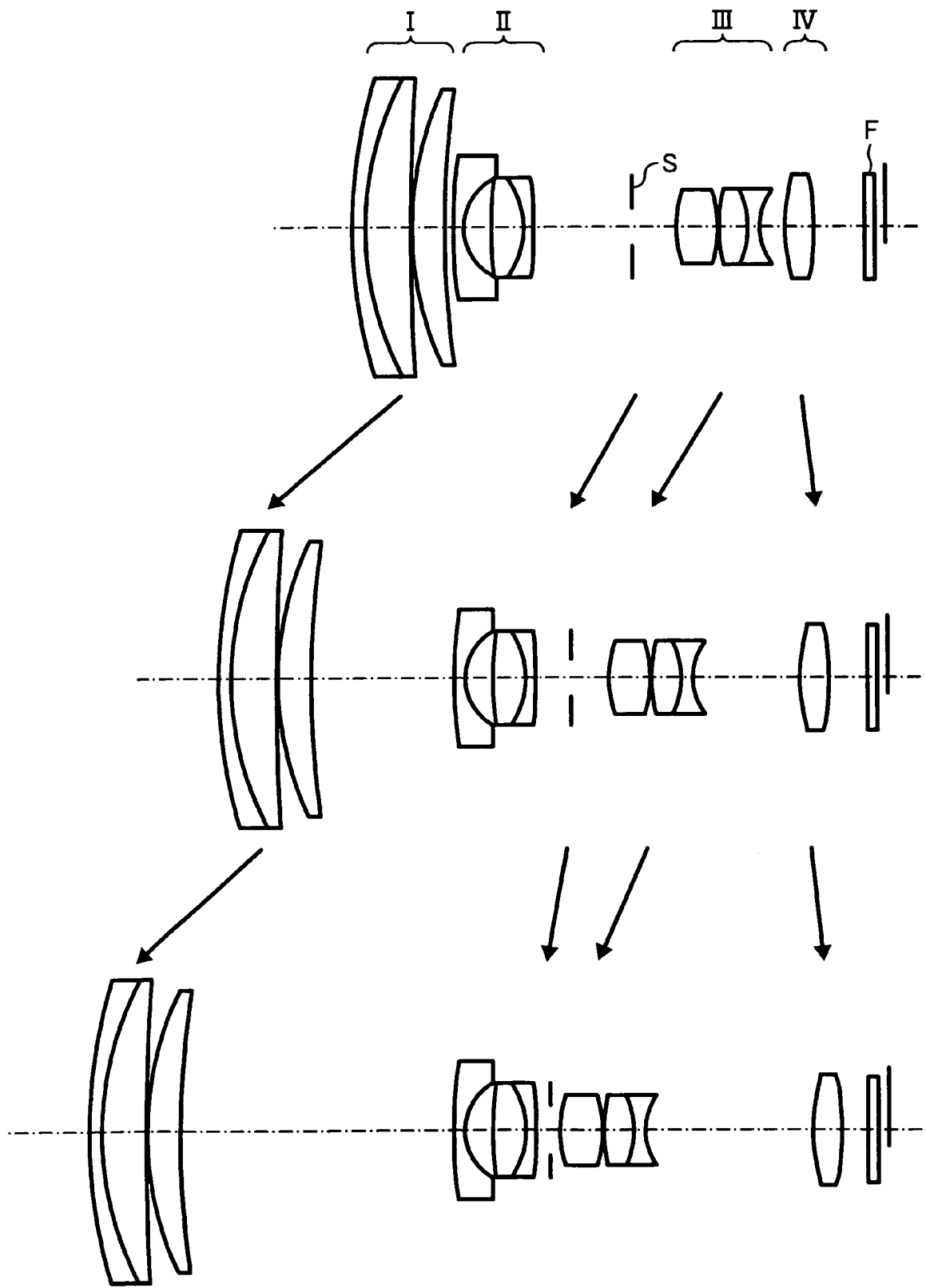
FIG. 21 is a view showing a lens structure and movement of each lens group of a seventh embodiment.

The following sixth to eighth embodiments are embodiments of a zoom lens set forth in the after mentioned FIGS. 20, 21, respectively. In addition, the fifth embodiment and sixth embodiment are also embodiments of a zoom lens set forth in the after mentioned FIG. 22.

Sixth Embodiment
f = 4.74-31.88, F = 3.49-5.02, ω = 39.20-6.50

| Surface No. | R | D | Nd | vd | Remarks |
|---|---|---|---|---|---|
| 01 | 35.951 | 1.00 | 1.84666 | 23.78 | First lens |
| 02 | 22.834 | 3.44 | 1.49700 | 81.54 | Second lens |
| 03 | 92.407 | 0.10 | | | |
| 04 | 26.507 | 2.58 | 1.80400 | 46.57 | Third lens |
| 05 | 79.541 | Variable (A) | | | |
| 06* | 37.724 | 0.84 | 1.80400 | 46.57 | Fourth lens |
| 07 | 4.355 | 2.31 | | | |
| 08 | 48.799 | 2.51 | 1.76182 | 26.52 | Fifth lens |
| 09 | −6.568 | 0.74 | 1.83481 | 42.71 | Sixth lens |
| 10* | −96.317 | Variable (B) | | | |
| 11 | Aperture stop | Variable (C) | | | |
| 12* | 7.796 | 2.85 | 1.58913 | 61.15 | Seventh lens |
| 13* | −10.195 | 0.10 | | | |
| 14 | 11.746 | 2.16 | 1.77250 | 49.60 | Eighth lens |
| 15 | −8.479 | 0.80 | 1.71736 | 29.52 | Ninth lens |
| 16 | 4.849 | Variable (D) | | | |
| 17* | 13.600 | 2.28 | 1.52470 | 56.20 | Tenth lens |
| 18* | −29.129 | Variable (E) | | | |
| 19 | ∞ | 0.80 | 1.51680 | 64.20 | Various filters |
| 20 | ∞ | | | | |

-continued

Aspheric Surface: Sixth Surface

K = 0.0,
$A_4 = 8.99680 \times 10^{-5}, A_6 = 1.17385 \times 10^{-5}$,
$A_8 = -2.28174 \times 10^{-6}, A_{10} = 1.61797 \times 10^{-7}$,
$A_{12} = -4.87869 \times 10^{-9}, A_{14} = 2.49023 \times 10^{-11}$,
$A_{16} = 1.66865 \times 10^{-12}, A_{18} = -2.55153 \times 10^{-14}$
Aspheric Surface: Tenth Surface K = 0.0,
$A_4 = -4.17819 \times 10^{-4}, A_6 = -1.85516 \times 10^{-5}$,
$A_8 = 1.73536 \times 10^{-6}, A_{10} = -1.09898 \times 10^{-7}$
Aspheric Surface: Twelfth Surface K = 0.0,
$A_4 = -6.52161 \times 10^{-4}, A_6 = -1.64731 \times 10^{-5}$,
$A_8 = 5.08316 \times 10^{-6}, A_{10} = -4.47602 \times 10^{-7}$
Aspheric Surface: Thirteenth Surface K = 0.0,
$A_4 = 3.04932 \times 10^{-4}, A_6 = -1.84286 \times 10^{-5}$,
$A_8 = 3.75632 \times 10^{-6}, A_{10} = -2.69027 \times 10^{-7}$
Aspheric Surface: Seventeenth Surface K = 0.0,
$A_4 = 6.36181 \times 10^{-5}, A_6 = -2.03691 \times 10^{-5}$,
$A_8 = -3.14875 \times 10^{-7}, A_{10} = -7.89983 \times 10^{-9}$
Aspheric Surface: Eighteenth Surface K = 0.0,
$A_4 = 2.63195 \times 10^{-4}, A_6 = -4.01829 \times 10^{-5}$.

| | Variable Spacing | | |
|---|---|---|---|
| | Short focus end f = 4.740 | Intermediate focal length f = 12.313 | Long focus end f = 31.883 |
| A | 0.600 | 10.861 | 21.200 |
| B | 7.955 | 3.420 | 1.150 |
| C | 3.400 | 2.374 | 0.750 |
| D | 2.745 | 9.291 | 13.554 |
| E | 3.693 | 2.706 | 2.285 |

Values of parameter in each condition r4F/fw = 2.86
|r3R|/fw = 1.02
(N4 − 1) $X_{40}$ ($H_{0.8}$)/Y'max = −0.00331
{(N4 − 1) $X_{40}$ ($H_{0.8}$) + (1 − N4) $X_{41}$ ($H_{0.8}$)}/Y'max = 0.0001
X1/fT = 0.646
X3/fT = 0.297
|f2|/f3 = 0.733
f1/fW = 9.07
dsw/fT = 0.107
m4T = 0.742
m4T/m4W = 1.118

Figure 26:
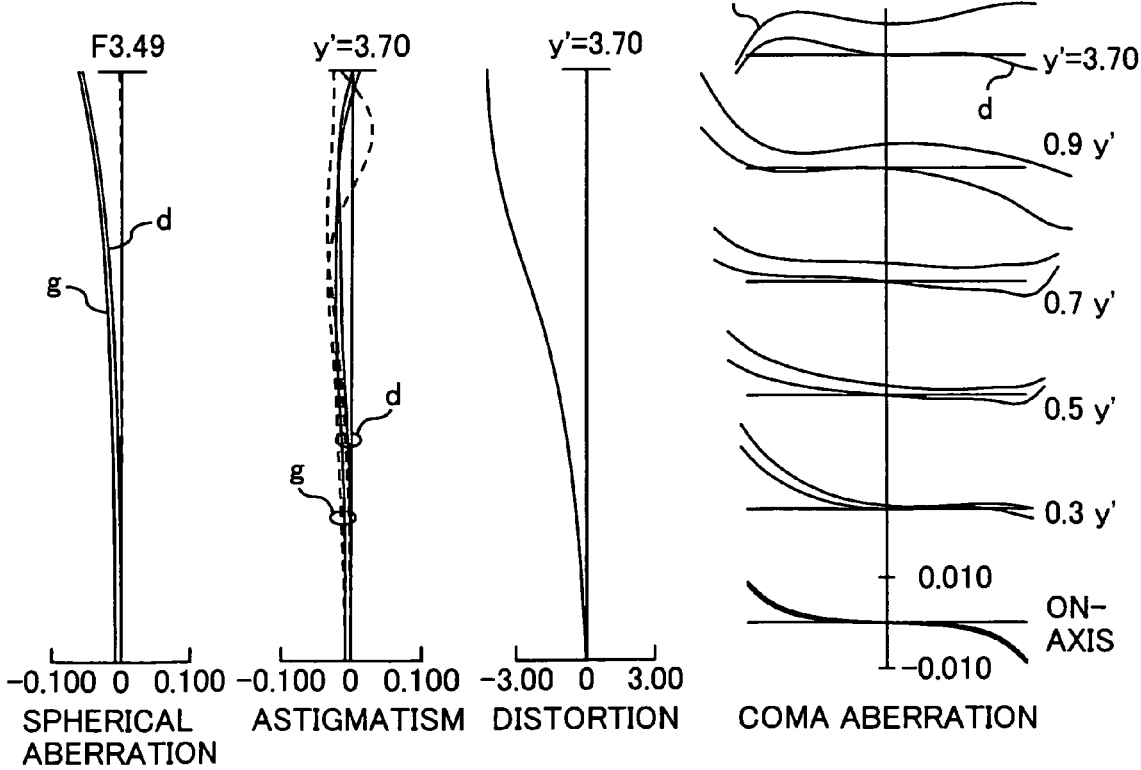
FIG. 26 is a view showing aberrations at a short focus end of the sixth embodiment.
Figure 27:
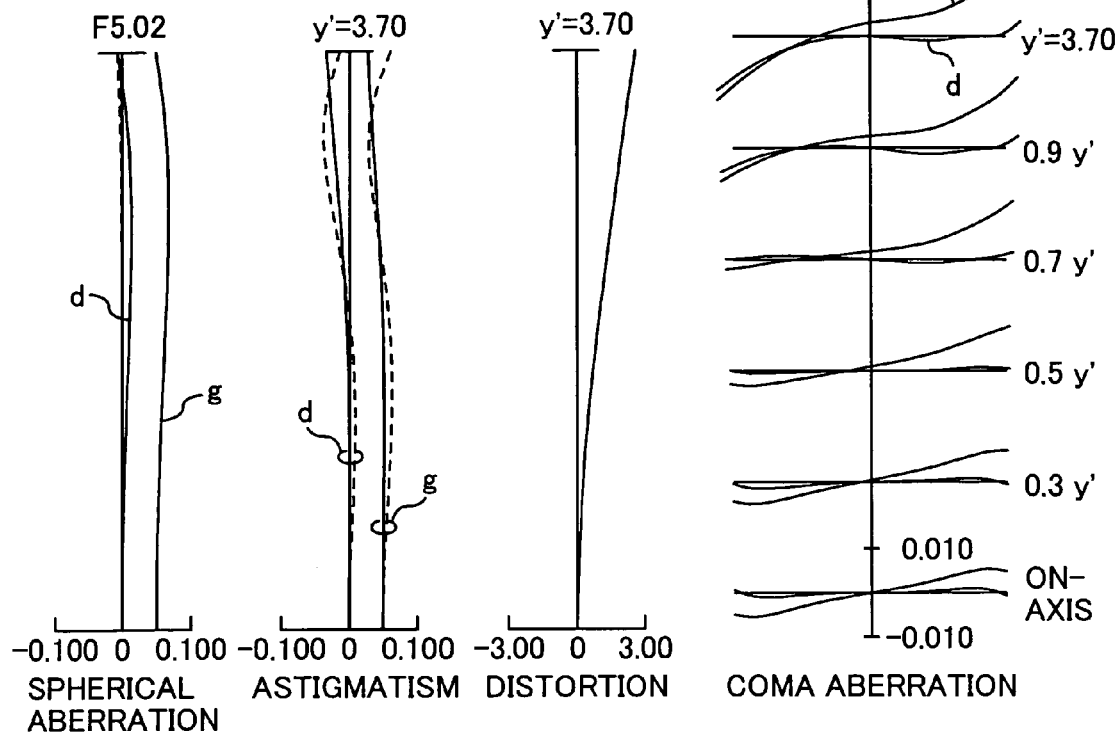
FIG. 27 is a view showing aberrations at an intermediate focal length of the sixth embodiment.
Figure 28:
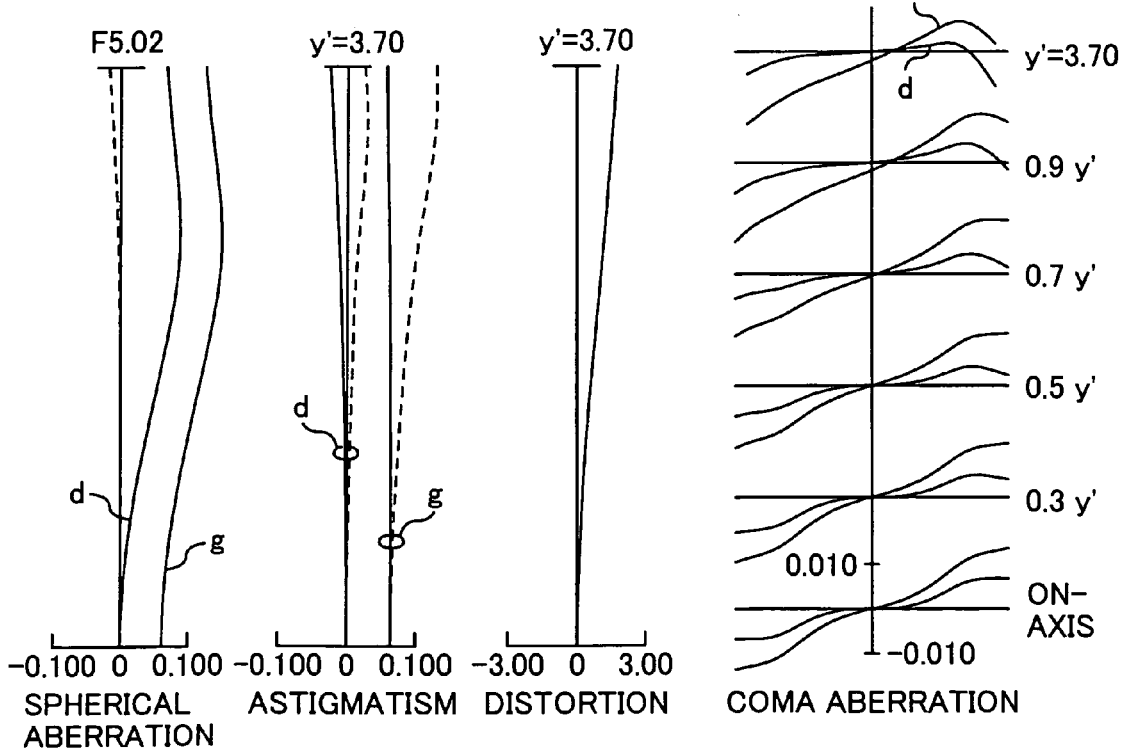
FIG. 28 is a view showing aberrations at a telephoto end of the sixth embodiment.

FIG. 20 shows the lens group arrangements of the wide angle end, intermediate focal length and telephoto end of the zoom lens in the sixth embodiment, as shown in FIG. 19. FIGS. 26, 27, 28 show the aberration diagrams in the short focus end (wide angle end), intermediate focal length and long focus end (telephoto end) of the sixth embodiment.

Seventh Embodiment
f = 4.74-31.92, F = 3.41-4.96, ω = 39.21-6.50

| Surface No. | R | D | Nd | vd | Remarks |
|---|---|---|---|---|---|
| 01 | 41.855 | 1.00 | 1.92286 | 18.90 | First lens |
| 02 | 25.753 | 3.56 | 1.49700 | 81.54 | Second lens |
| 03 | 190.984 | 0.10 | | | |
| 04 | 26.286 | 2.60 | 1.80100 | 34.97 | Third lens |
| 05 | 79.407 | Variable (A) | | | |
| 06* | 49.690 | 0.84 | 1.80400 | 46.57 | Fourth lens |
| 07 | 4.425 | 2.16 | | | |
| 08 | 31.461 | 2.56 | 1.76182 | 26.52 | Fifth lens |
| 09 | −6.729 | 0.74 | 1.83481 | 42.71 | Sixth lens |
| 10* | −192.919 | Variable (B) | | | |
| 11 | Aperture stop | Variable (C) | | | |
| 12* | 8.333 | 3.24 | 1.58913 | 61.15 | Seventh lens |
| 13* | −9.750 | 0.10 | | | |
| 14 | 12.866 | 2.30 | 1.77250 | 49.60 | Eighth lens |
| 15 | −6.860 | 0.92 | 1.69895 | 30.13 | Ninth lens |
| 16 | 4.883 | Variable (D) | | | |
| 17* | 14.000 | 2.24 | 1.52470 | 56.20 | Tenth lens |
| 18* | −27.429 | Variable (E) | | | |
| 19 | ∞ | 0.80 | 1.51680 | 64.20 | Various filters |
| 20 | ∞ | | | | |

Aspheric Surface: Sixth Surface

K = 0.0,
$A_4 = 1.35106 \times 10^{-4}, A_6 = 7.13509 \times 10^{-6}$,
$A_8 = -2.03682 \times 10^{-6}, A_{10} = 1.58321 \times 10^{-7}$,
$A_{12} = -4.98957 \times 10^{-9}, A_{14} = 2.26545 \times 10^{-11}$,
$A_{16} = 1.98630 \times 10^{-12}, A_{18} = -3.06836 \times 10^{-14}$
Aspheric Surface: Tenth Surface K = 0.0,
$A_4 = -4.40187 \times 10^{-4}, A_6 = -1.48144 \times 10^{-5}$,
$A_8 = 1.18271 \times 10^{-6}, A_{10} = -9.13757 \times 10^{-8}$
Aspheric Surface: Twelfth Surface K = 0.0,
$A_4 = -7.36357 \times 10^{-4}, A_6 = 2.56137 \times 10^{-6}$,
$A_8 = 6.10932 \times 10^{-7}, A_{10} = -1.13596 \times 10^{-7}$
Aspheric Surface: Thirteenth Surface K = 0.0,
$A_4 = 2.25294 \times 10^{-4}, A_6 = -9.54574 \times 10^{-7}$,
$A_8 = 6.24322 \times 10^{-7}, A_{10} = -8.33183 \times 10^{-8}$
Aspheric Surface: Seventeenth Surface K = 0.0,
$A_4 = 1.32808 \times 10^{-4}, A_6 = -1.93965 \times 10^{-5}$,
$A_8 = -1.13182 \times 10^{-7}, A_{10} = -9.68041 \times 10^{-9}$
Aspheric Surface: Eighteenth Surface K = 0.0,
$A_4 = 2.76724 \times 10^{-4}, A_6 = -3.54986 \times 10^{-5}$.

| | Variable Spacing | | |
|---|---|---|---|
| | Short focus end f = 4.738 | Intermediate focal length f = 12.316 | Long focus end f = 31.917 |
| A | 0.667 | 11.185 | 21.200 |
| B | 7.739 | 2.784 | 1.150 |
| C | 3.447 | 2.914 | 0.750 |
| D | 2.000 | 8.424 | 13.152 |
| E | 3.986 | 3.028 | 2.072 |

A value of parameter of each condition r4F/fw = 2.95
|r3R|/fw = 1.03
(N4 − 1) $X_{40}$ ($H_{0.8}$)/Y'max = −0.00166
{(N4 − 1) $X_{40}$ ($H_{0.8}$) + (1 − N4) $X_{41}$ ($H_{0.8}$)}/Y'max = 0.00032
X1/fT = 0.643
X3/fT = 0.291
|f2|/f3 = 0.743
f1/fW = 8.98
dsw/fT = 0.108
m4T = 0.756
m4T/m4W = 1.164

Figure 29:
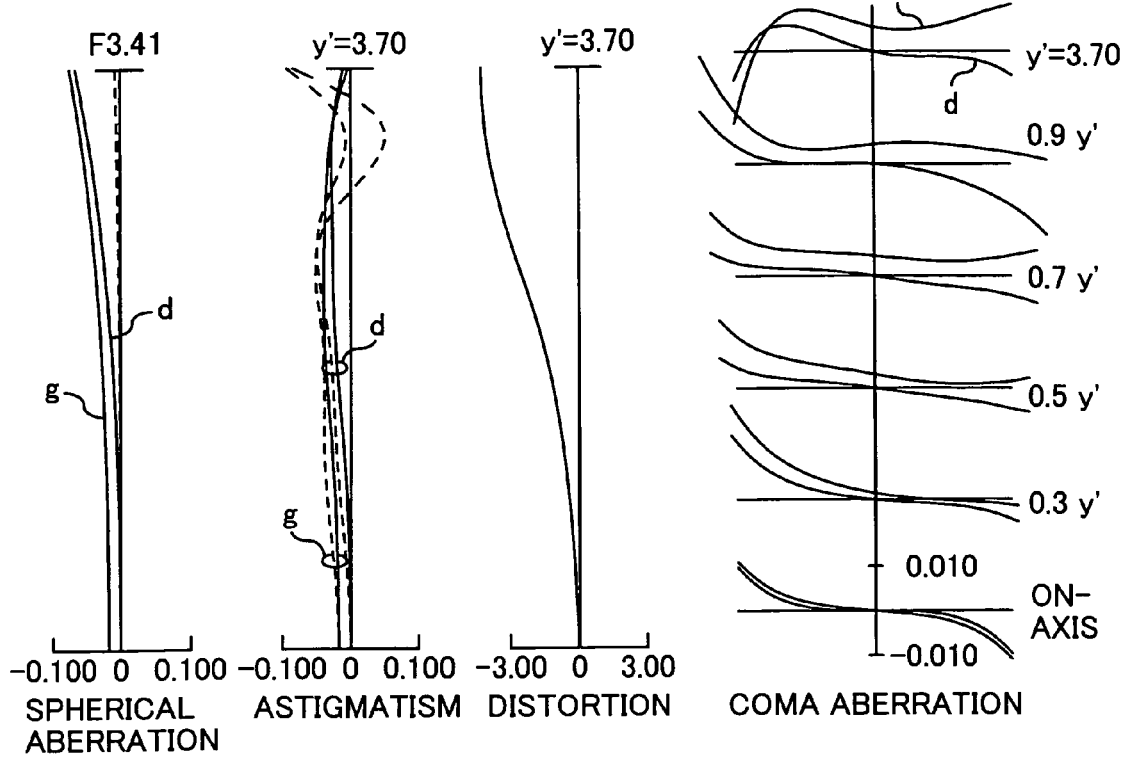
FIG. 29 is a view showing aberrations at a short focus end of the seventh embodiment.
Figure 30:
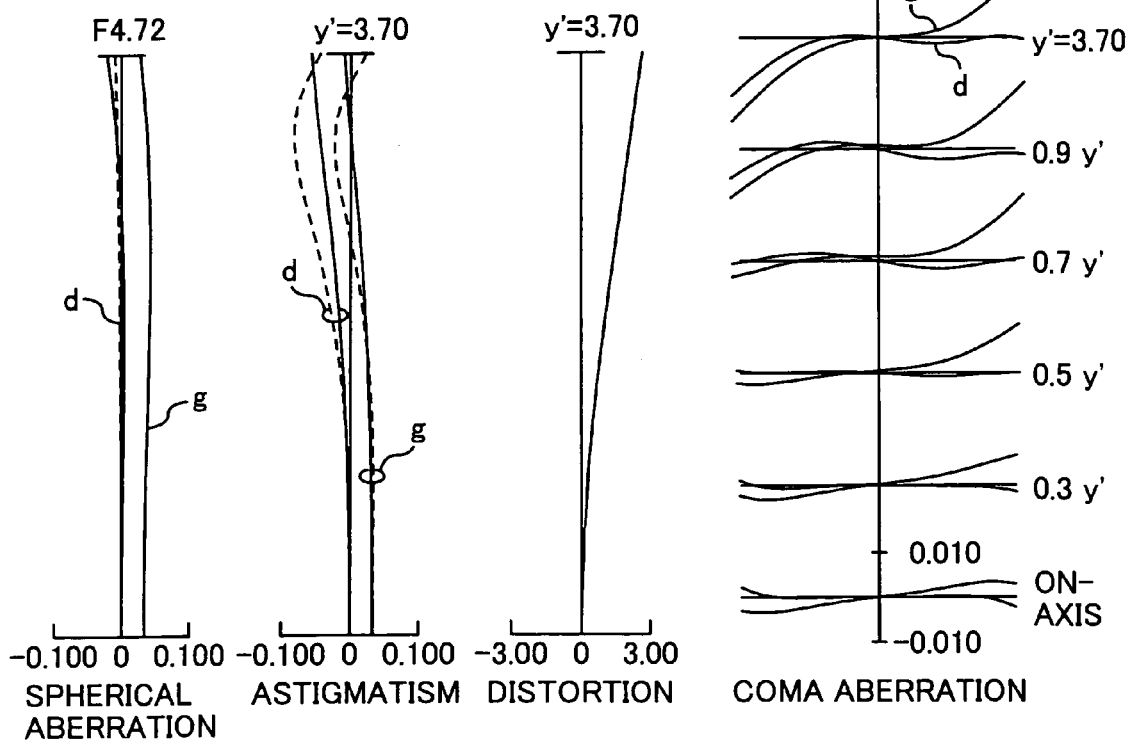
FIG. 30 is a view showing aberrations at an intermediate focal length of the seventh embodiment.
Figure 31:
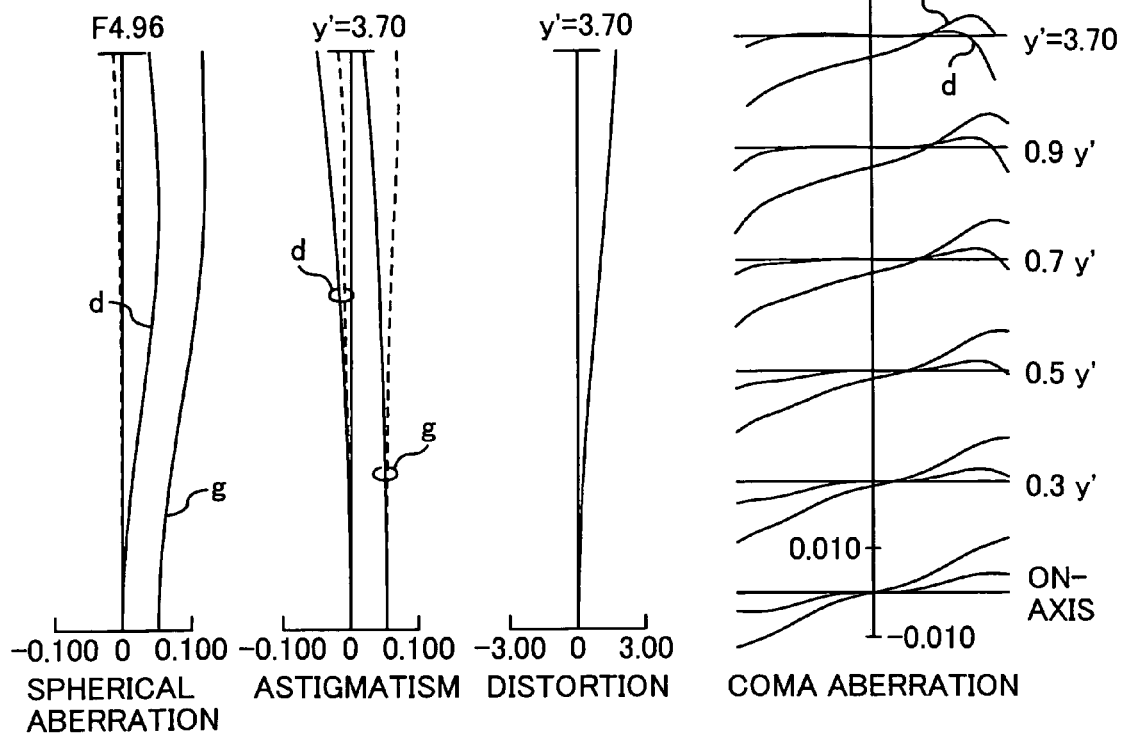
FIG. 31 is a view showing aberrations at an intermediate focal length of the seventh embodiment.

FIG. 21 shows the lens group arrangements of the wide angle end, intermediate focal length and telephoto end of the zoom lens in the seventh embodiment, as shown in FIG. 19. FIGS. 29, 30, 31 show the aberration diagrams in the short focus end (wide angle end), intermediate focal length, and long focus end (telephoto end) of the seventh embodiment.

Eighth Embodiment
f = 4.74-21.53, F = 3.44-5.03, ω = 39.15-9.57

| Surface No. | R | D | Nd | vd | Remarks |
|---|---|---|---|---|---|
| 01 | 21.750 | 0.90 | 1.92286 | 20.88 | First lens |
| 02 | 13.560 | 4.07 | 1.72342 | 37.99 | Second lens |
| 03 | 134.922 | Variable (A) | | | |
| 04* | 59.812 | 0.79 | 1.83500 | 42.98 | Third lens |
| 05 | 4.406 | 2.04 | | | |
| 06 | 21.026 | 2.18 | 1.76182 | 26.61 | Fourth lens |
| 07 | −8.261 | 0.64 | 1.83500 | 42.98 | Fifth lens |
| 08* | −1778.290 | Variable (B) | | | |
| 09 | Aperture stop | Variable (C) | | | |
| 10* | 7.086 | 2.58 | 1.58913 | 61.25 | Sixth lens |
| 11* | −9.843 | 0.10 | | | |
| 12 | 11.489 | 2.15 | 1.75500 | 52.32 | Seventh lens |
| 13 | −7.050 | 0.80 | 1.68893 | 31.16 | Eighth lens |
| 14 | 4.281 | Variable (D) | | | |
| 15* | 12.000 | 1.87 | 1.58913 | 61.25 | Ninth lens |
| 16* | −54.281 | Variable (E) | | | |
| 17 | ∞ | 0.90 | 1.51680 | 64.20 | Various filters |
| 18 | ∞ | | | | |

Aspheric Surface: Fourth Surface $K = 0.0$,
$A_4 = 1.80601 \times 10^{-4}, A_6 = -4.15776 \times 10^{-6}$,
$A_8 = 6.07946 \times 10^{-8}, A_{10} = -5.54895 \times 10^{-10}$
Aspheric Surface: Eighth Surface $K = 0.0$,
$A_4 = -4.65567 \times 10^{-4}, A_6 = -1.01371 \times 10^{-5}$,
$A_8 = -1.76981 \times 10^{-7}, A_{10} = -4.26668 \times 10^{-8}$
Aspheric Surface: Tenth Surface $K = 0.0$,
$A_4 = -8.59157 \times 10^{-4}, A_6 = 1.14866 \times 10^{-6}$,
$A_8 = 4.43235 \times 10^{-7}, A_{10} = -1.52194 \times 10^{-7}$
Aspheric surface: Eleventh surface $K = 0.0$,
$A_4 = 3.42627 \times 10^{-4}, A_6 = -8.22671 \times 10^{-6}$,
$A_8 = 1.63733 \times 10^{-6}, A_{10} = -1.97295 \times 10^{-7}$
Aspheric Surface: Fifteenth Surface $K = 0.0$,
$A_4 = 9.64225 \times 10^{-5}, A_6 = -1.02076 \times 10^{-5}$,
$A_8 = -4.40239 \times 10^{-8}, A_{10} = -6.16955 \times 10^{-9}$
Aspheric Surface: Sixteenth Surface $K = 0.0$,
$A_4 = 2.16730 \times 10^{-4}, A_6 = -2.27633 \times 10^{-5}$.

Variable Spacing

| | Short focus end f = 4.741 | Intermediate focal length f = 10.106 | Long focus end f = 21.531 |
|---|---|---|---|
| A | 0.855 | 8.427 | 15.142 |
| B | 8.351 | 2.914 | 1.200 |
| C | 3.052 | 2.948 | 1.000 |
| D | 3.247 | 6.975 | 12.160 |
| E | 2.680 | 2.680 | 2.680 |

A value of parameter in each condition r4F/fw = 2.53
|r3R|/fw = 0.903
(N4 − 1) $X_{40}$ ($H_{0.8}$)/Y'max = −0.00060
{(N4 − 1) $X_{40}$ ($H_{0.8}$) + (1 − N4) $X_{41}$ ($H_{0.8}$)}/Y'max = 0.00013
X1/fT = 0.650
X3/fT = 0.414
|f2|/f3 = 0.813
f1/fW = 9.13

-continued dsw/fT = 0.142
m4T = 0.702
m4T/m4W = 1.0
(the fourth lens group is fixed during changing the magnification)

Figure 22:
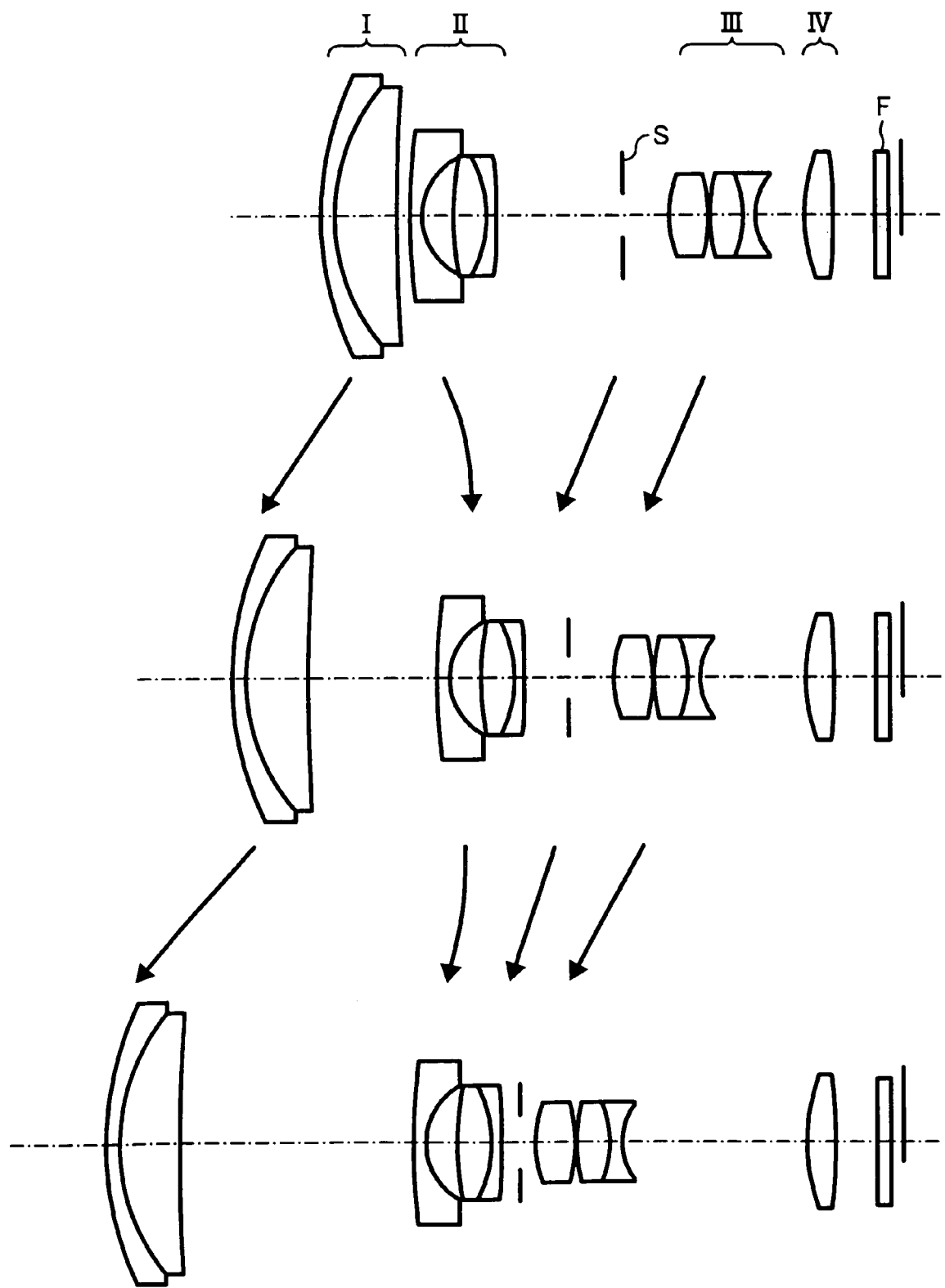
FIG. 22 is a view showing a lens structure and a movement of each lens group of an eighth embodiment.
Figure 32:
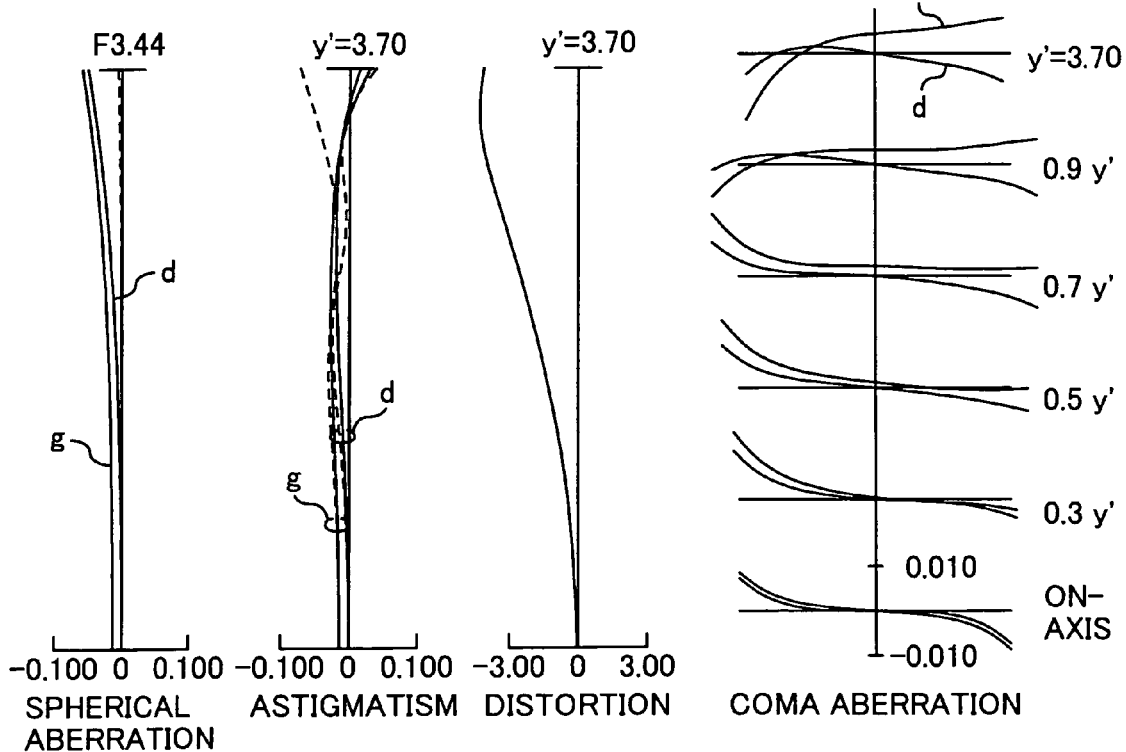
FIG. 32 is a view showing aberrations at a short focus end of the eighth embodiment.
Figure 33:
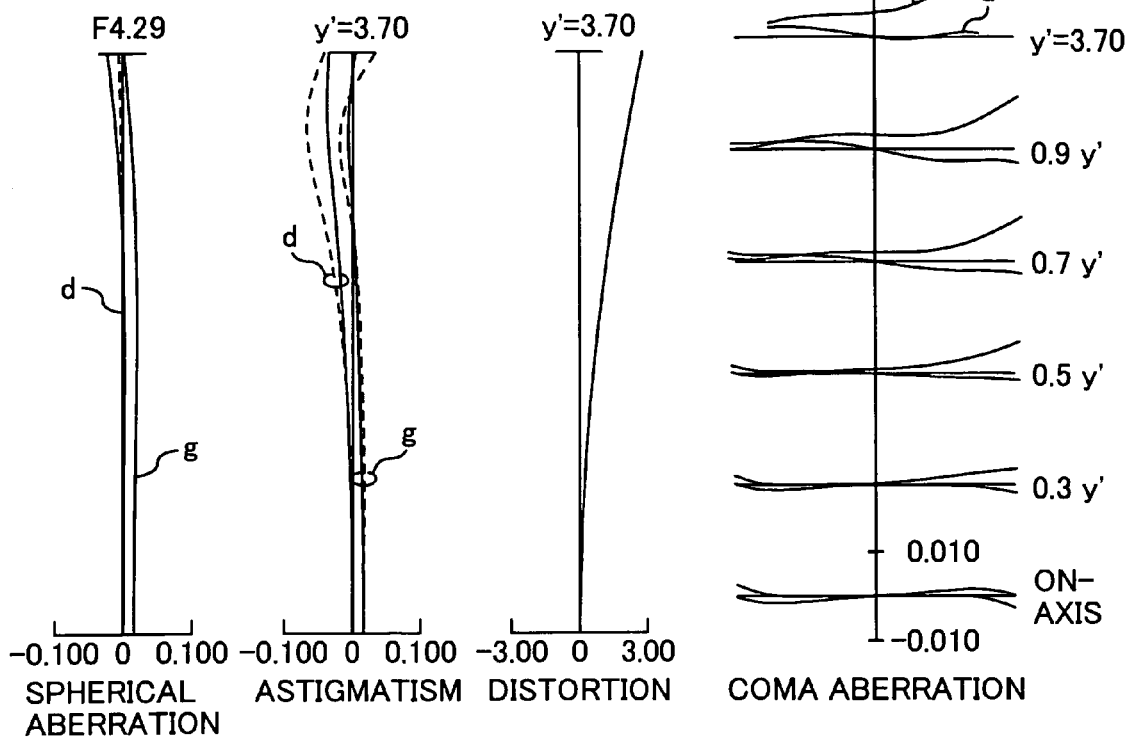
FIG. 33 is a view showing aberrations at an intermediate focal length of the eighth embodiment.
Figure 34:
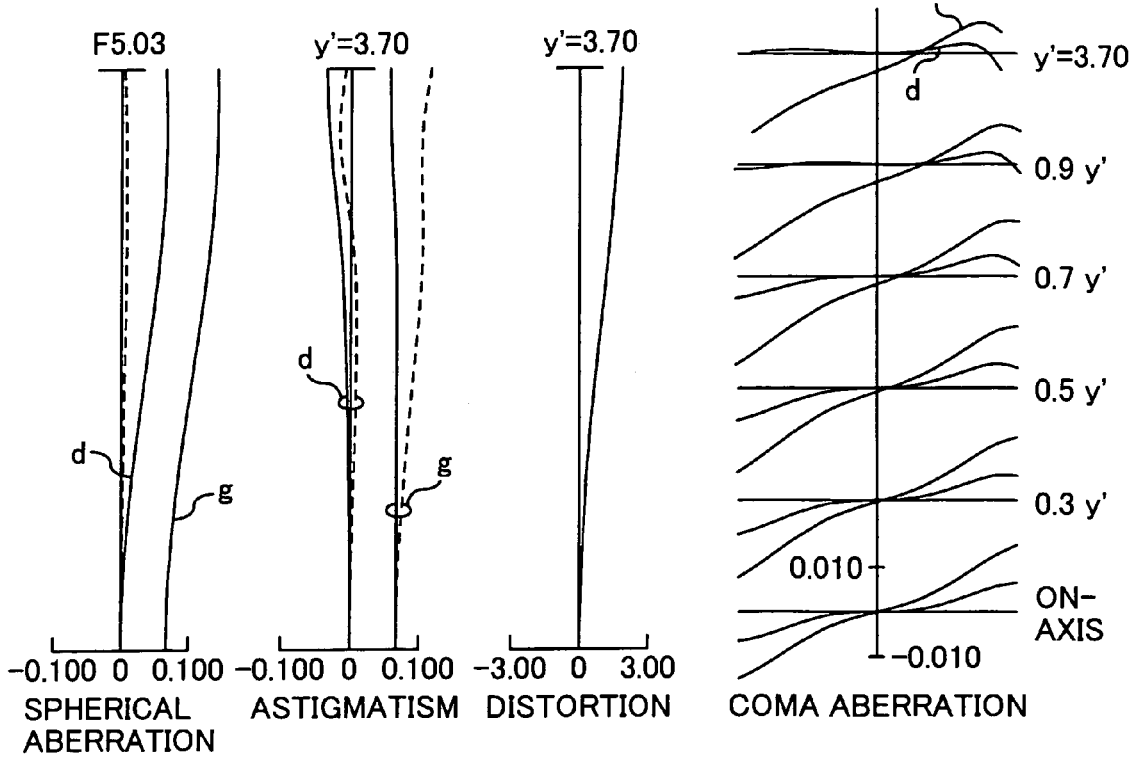
FIG. 34 is a view showing aberrations at a telephoto end of the eighth embodiment.

FIG. 22 shows lens group arrangements of a wide angle end, intermediate focal length and telephoto end of a zoom lens in the eighth embodiment, as shown in FIG. 22. FIGS. 32, 33, 34 show aberration diagrams in a short focus end (wide angle end), intermediate focal length, long focus end (telephoto end) of the eighth embodiment.

In FIGS. 19-20 showing the lens group arrangements of each of the embodiments, the left side of the figure is an object side, reference number I denotes a first lens group, II denotes a second lens group, S denotes an aperture stop, III denotes a third lens group, and IV denotes a fourth lens group.

An embodiment 2 of an information device will be described with reference to FIGS. 17A, 17B, 17C, 18. In this embodiment, the information device is performed as "a personal digital assistance device".

As shown in FIGS. 17A, 17B, 17C, 18, a portable digital assistance device 30 includes a photographing lens 31 and a light receiving element (area sensor) 45 of an image pickup device. In the portable digital assistance device 30, "an image of a photographing object" by the photographing lens 31 is imaged onto the light receiving element 45, and the image is loaded by the light receiving element 45.

As the photographing lens 31, any one of the zoom lenses set forth in the after-mentioned FIGS. 19-42, more particularly, any one of the zoom lenses described in the fifth to eighth embodiments is used, for example. In addition, as the light receiving element 45, a light receiving element having 4 million to 8 million pixels or more, for example, a CCD area sensor having the opposite angle length of light receiving area, 9.1 mm, the pixel pitch, 2.35 μm and about 7 million pixels, and a CCD sensor having the opposite angle length of light receiving area, 9.1 mm, the pixel pitch, 21 μm, and about 10 million pixels can be used.

As shown in FIG. 18, the output from the light receiving element 45 is processed by a signal processing device 42, which receives control of a central processing unit 40 to be converted into the digital information. The image information digitized by the signal processing device 42 is recorded in a semiconductor memory 44 after receiving a predetermined image process in an image processing device 41, which receives the control of the central processing unit 40. A liquid crystal monitor 38 can display "an image during photographing" and also "an image recorded in the semiconductor memory 44". Moreover, the image recorded in the semiconductor memory 44 can be sent to the external by using a communication card 43, etc.

As shown in FIG. 17A, the photographing lens 31 is in "a collapsed state" while the device is being carried. If a user operates a power source switch 36 to turn on the power as shown in FIG. 17B, the lens barrel is extended. In this case, in the interior of the lens barrel, each group of the zoom lens is in, for example, "the arrangement of short focus end", and the arrangement of each group can be changed by operating a zoom lever 34; thus, the magnification can be changed to the long focus end. In this case, a magnification of a finder 33 is changed in conjunction with the change in field angle of the photographing lens 31.

The focusing is performed by half-pressing a shutter bottom 35. The focusing can be performed by moving the second lens group or the fourth lens group, or by moving the light receiving element 45, when using the zoom lenses described in the fifth to eighth embodiments. The photographing is performed by further pressing the shutter bottom 35, and then the above processes are conducted.

When displaying the image recorded in the semiconductor memory 44 on the liquid crystal monitor 38, and when sending the image to the external by using the communication card 43, etc., operation bottoms 37 are used. The semiconductor memory 44, communication card 43, etc., can be inserted into the dedicated or general-purpose slots 39A, 39B.

In addition, when the photographing lens 31 is in a collapsed state, each group of the zoom lens is not necessary to be lined on the optical axis. For example, if the zoom lens has a structure that the third lens group is retracted from the optical axis to be stored in parallel with other lens groups, the information device can be further downsized.

The zoom lens set forth in each of the fifth to eighth embodiments can be used as the photographing lens 31 in the above explained portable digital assistance device. Accordingly, a small and high quality portable digital assistance device using a light receiving element having 4 million to 8 million pixels or more can be achieved.

Additional Embodiment 2

A zoom lens according to the present invention comprises, in order from an object side, a first lens group having a positive refracting power, a second lens group having a negative refracting power, a third lens group having a positive refracting power, a fourth lens group having a positive refracting power, and at least the first lens group and the third lens group being moved to the object side such that an interval between the first lens group and the second lens group increases, an interval between the second lens group and the third lens group decreases and an interval between the third lens group and the fourth lens group increases during changing a magnification from a wide angle end to a telephoto end.

The zoom lens of the present invention has the following features. More particularly, the first lens group comprises one negative lens and two positive lenses, and the fourth lens group comprises one positive lens. A focal length of an entire system at the wide angle end, fw, and a curvature radius of the object side surface of the positive lens comprising the fourth lens group, r4F satisfy the following condition: (11) $1.6 < r4F/fw < 4.0$.

The zoom lens of the present invention has the following features. More particularly, the fourth lens group comprises one positive lens having an aspheric surface on both surfaces, and a focal length of an entire system at the wide angle end, fw, and a radius curvature of the object side surface of the positive lens comprising the fourth lens group, r4F satisfy the above condition (11).

According to the zoom lens of the present invention, it is preferable for a refractive index of the positive lens comprising the fourth lens group, N4, an aspheric surface amount in 80% of a maximum ray effective height in the aspheric surface of the object side of the positive lens, $X_{40}$ ($H_{0.8}$), an aspheric surface amount in 80% of a maximum ray effective height in the aspheric surface of the image side of the positive lens, $X_{41}$ ($H_{0.8}$), and a maximum image height, $Y'_{max}$ to satisfy the following conditions: (12) $-0.0080 < (N4-1) X_{40} (H_{0.8})/Y'max < 0.0$, (13) $-0.0010 < \{(N4-1) X_{40} (H_{0.8}) + (1-N4) X_{41} (H_{0.8})\}/Y'max < 0.0010$.

According to the zoom lens of the present invention, the first lens group can comprise one negative lens and two positive lenses.

According to the zoom lens of the present invention, it is preferable for total displacement of the first lens group during changing the magnification from the wide angle end to the telephoto end, X1 and a focal length of an entire system at the telephoto end, fT to satisfy the following condition: (14) $0.30 < X1/f1 < 0.85$.

According to the zoom lens of the present invention, it is preferable for total displacement of the third lens group during changing the magnification from the wide angle end to the telephoto end, X3 and a focal length of an entire system at the telephoto end, fT to satisfy the following condition: (15) $0.15 < X3/fT < 0.50$.

According to the zoom lens of the present invention, it is preferable for a focal length of the second lens group, f2 and a focal length of the third lens group, f3 to satisfy the following condition: (16) $0.6 < |f2|/f3 < 1.0$.

According to the zoom lens of the present invention, it is preferable for a focal length of the first lens group, f1 and the focal length of the entire system at the wide angle end, fw to satisfy the following condition: (17) $6.0 < f1/fW < 12.0$.

According to the zoom lens of the present invention, it is preferable for a negative lens having a strong concave surface on the image side is arranged in the most image side of the third lens group, and a curvature radius of the image side surface of the negative lens, r3R to satisfy the following condition: (18) $0.7 < |r3R|/fw < 1.3$.

According to the zoom lens of the present invention, an aperture stop can be disposed between the second lens group and the third lens group, and the aperture stop can be moved independently of the neighboring lens groups. In this case, it is preferable for an interval between the aperture stop and the third lens group to become wider at the wide angle end than the telephoto end, and it is preferable for an axial distance between the aperture stop and the surface of the most object side of the third lens group at the wide angle end, dsw to satisfy the following condition: (19) $0.08 < dsw/fT < 0.20$.

According to the zoom lens of the present invention, during changing the magnification from the wide angle end to the telephoto end, the fourth lens group can be fixed, the first and third lens groups can be moved to the object side, and the second lens group can moved to the image side along a convex curve (can be moved to the object side after moving to the image side).

According to the zoom lens of the present invention, during changing the magnification from the wide angle end to the telephoto end, the second lens group can be fixed, the first and third lens groups can be moved to the object side, and the fourth lens group can be moved to the image side. In this case, it is preferable for the fourth lens group to position closer to the image side at the telephoto end than the wide angle end. It is more preferable for an imaging magnification of the fourth lens group at the telephoto end, m4T to satisfy the following condition: (20) $0.60 < m4T < 0.85$. In addition, it is preferable for an imaging magnification of the fourth lens group at the telephoto end, m4T and an imaging magnification of the fourth lens group at the wide angle end, m4W to satisfy the following condition: (21) $1.0 < m4T/m4W < 1.3$.

According to an information device having a photographing function of the present invention, the above zoom lens can be used as an optical system for photographing. In this information device, an object image by the zoom lens can be imaged on a light receiving surface of an image pickup device. In this case, the number of pixels of the image pickup device can be 4 million to 8 million pixels or more.

As described above, the information device can be performed as a digital camera and video camera, and also it can be preferably performed as a personal digital assistance device.

Filling in the details, generally, the zoom lens comprising the four lens groups having the arrangement of positive, negative, positive and positive refracting power according to the present invention is constructed as a so-called variator that the second lens group bears a major changing magnification function. With such a zoom lens, it becomes extremely difficult to correct aberration with the wider field angle and larger changing magnification. However, in the present invention, the third lens group shares the changing magnification function to reduce the burden of the second lens group. Accordingly, the flexibly of aberration correction for achieving the wider field angle and larger changing magnification can be secured.

In addition, during changing the magnification from the wide angle end to the telephoto end, the first lens group is significantly moved to the object side, more particularly, the first lens group is positioned closer to the image side at the wide angle end than the telephoto end. Thereby, the height of ray passing the first lens group at the wide angle end is reduced, and the first lens group, which grows in size by the wider filed angle, is controlled, and also a larger interval between the first lens group and the second lens group is secured at the telephoto end to achieve a long focal point.

During changing the magnification from the wide angle end to the telephoto end, the interval between the first lens group and the second lens group increases, the interval between the second lens group and the third lens group decreases, the magnifications of both of the second lens group and the third lens group increase, and the second lens group and the third lens group share the changing magnification function each other.

In the zoom lens of the present invention, the first lens group comprises one negative lens and two positive lenses, and the fourth lens group comprises one positive lens.

In order to obtain larger changing magnification, especially, to increase a focal length of telephoto end, it is necessary to increase the combined magnification of the second lens group and the third lens group at the telephoto end, and the aberration, which is generated in the first lens group in accordance with the increased combined aberration, is increased on the image surface. Therefore, in order to advance the larger changing magnification, it is necessary to sufficiently reduce the aberration amount, which is generated in the first lens group. In order to do that, it is preferable for the first lens group to have the above structure. Moreover, the minimum number of lenses comprising the fourth lens group contributes to the downsizing of the lens system in a large way.

The above condition (11) defines the most appropriate range of a curvature radius of object side surface of the positive lens comprising the fourth lens group. If the parameter, r4F/fw is smaller than 1.6, the positive refracting power of the object side surface of the fourth lens group becomes too strong. Thereby, the image surface falls to the negative side, and also the coma aberration is deteriorated. On the other hand, if the parameter, r4W/fw becomes larger than 4.0, the image surface falls to the positive side, and also the coma aberration in the opposite direction is generated, resulting in the deterioration in the performance.

In addition, it is preferable for the parameter, r4F/fw to satisfy the following condition (11A) 2.1<r4F/fw<3.5, which is slightly narrower than the condition (11).

The above effect can be obtained by adopting the aspheric surface on both surfaces of one positive lens comprising the fourth lens group, and by satisfying the above condition (11) and, preferably, the condition (11A).

The off-axis aberration can be sophisticatedly balanced over the entire zooming area by adopting the aspheric surface on both surfaces of one positive lens comprising the fourth lens group, compared with a spherical surface on both surfaces, and an aspheric surface on one surface. Thereby, the wider filed angle and larger changing magnification can be easily achieved.

The conditions (12), (13) are preferable to achieve a preferable performance when both surfaces of one positive lens comprising the fourth lens group comprise an aspheric surface shape.

The aspheric surface amount in those conditions, "X(H)" is "a difference of a sag in a height from an optical axis, H" of a spherical surface defined by a paraxial curvature of aspheric surface and an actual aspheric surface", and is defined the direction from the object side toward the image side as positive.

It is desirable for the object side surface of the positive lens comprising the fourth lens group to be an aspheric surface that the positive refracting power decreases as turning from the optical axis at least in the portion of 80% or more of effective height of the maximum ray. Also it is desirable for the image side surface to be an aspheric surface having a shape that the positive refracting power increases as turning from the optical axis at least in the portion of 80% or more of effective height of the maximum ray.

The parameter in the condition (12), $(N4-1) X_{40} (H_{0.8})/Y'max$ takes a negative value such that the aspheric surface amount, $X_{40} (H_{0.8})$ becomes an aspheric surface having a shape that the positive refracting power decreases as turning from the optical axis. Therefore, the upper limit value of the condition (12) is 0.0.

If the parameter of condition (12), $(N4-1) X_{40} (H_{0.8})/Y'max$ becomes smaller than the lower limit value of −0.0080, the aspheric surface amount in the neighboring portion of the fourth lens group becomes too big to the negative side. Thereby, for example, when the height of ray passing the fourth lens group is changed with the focusing, the fluctuation of aberration is increased. Therefore, it becomes difficult to secure the performance with respect to a close-range subject.

If the parameter of the condition (13), $\{(N4-1) X_{40} (H_{0.8})+(1-N4) X_{41} (H_{0.8})\}/Y'max$ is smaller than the lower limit value of −0.0010, the positive refracting power becomes too weak in the neighboring portion of the fourth lens group. Thereby, the defects that the image surface falls in the pulse direction and the distortion at the wide angle end becomes a cone shape are easily occurred. On the other hand, if the parameter, $\{(N_4-1) X_{40} (H_{0.8})+(1-N_4) X_{41} (H_{0.8})\}/Y'_{max}$ is larger than the upper limit value of 0.0010, the positive refracting power in the neighboring portion of the fourth lens group becomes too strong. Thereby, the image surface falls in the minus direction, and also the distortion at the wide angle end increases at minus (barrel shape).

In order to preferably correct the aberrations, it is desirable to arrange the negative lens having a strong concave surface on the image side in the most image side of the third lens group neighboring to the object side of the fourth lens group, and also it is preferable for the radius of curvature of the image side surface of this negative lens, r3R to satisfy the condition (18).

If the parameter of condition (18), |r3R|/fw is smaller than the lower limit value of 0.7, the spherical aberration is excessively corrected. If the parameter is larger than the upper limit value of 1.3, the correction of spherical aberration becomes insufficient. Moreover, similar to the aspheric aberration in the outside of the range of condition (18), it is difficult to balance the coma aberration and extroversion or introversion coma aberration is easily generated at the off-axis neighboring portion.

The condition (14) controls the displacement of first lens group which is important for the wider filed angle and longer focal point, and enables sufficient aberration correction. If the parameter, X1/fT becomes lower than the lower limit value of 0.30, the displacement of first lens group decreases. Thereby, the contribution to the changing magnification of the second lens group decreases. Accordingly, the share of the third lens group increases, or the refracting power of the first lens group and the second lens group have to be strengthened, resulting in the deterioration in various aberrations in either case. In addition, the total length of lens at the wide angle end increases, and the height of ray passing the first lens group increases, causing the growing in size of the first lens group.

If the parameter, X1/fT becomes larger than the upper limit value of 0.85, the entire length at the wide angle end becomes too short or the entire length at the telephoto end becomes too long. If the entire length at the wide angle end becomes too short, the moving space of the third lens group is limited, and the contribution to the changing magnification of the third lens group decreases. Thereby, the entire aberration correction becomes difficult. Moreover, if the entire length at the telephoto end becomes too long, it disturbs the downsizing of the entire length direction, the diameter direction is grown in size for securing the light volume of neighboring at the telephoto end, and also the image performance can be easily deteriorated by manufacturing errors such as falling of a lens barrel.

It is preferable for the parameter, X1/fT to satisfy the condition (14A) 0.40<X1/fT<0.75, which is slightly narrower than the condition (14).

The condition (15) controls the displacement of third lens group with the changing magnification in terms of aberration correction and compactification.

If the parameter, X3/fT becomes smaller than the lower limit value of 0.15, the contribution to the changing magnification of the third lens group decreases because the displacement of third lens group with the changing magnification is small. Accordingly, the burden of the second lens group increases, or the refracting power of the third lens group has to be strengthened, resulting in the deterioration of various aberrations in either case.

It is more preferable for the parameter, X3/fT to satisfy the condition: (15A) 0.20<X3/fT<0.45, which is slightly narrower than the condition (15).

The conditions (17), (18) are conditions to achieve more preferable aberration correction.

If the parameter of condition (16), |f2|/f3 is smaller than the lower limit value of 0.6, the refracting power of second lens group becomes too strong, and if the parameter is larger than the upper limit of value 1.0, the refracting power of third lens group becomes too strong. Thereby, the fluctuation in the aberration during changing the magnification is easily increased in either case.

If the parameter of condition (17), f2/fW is smaller than the lower limit value of 6.0, the imaging magnification of second lens group approaches to the same magnification, and the changing magnification efficiency increases. Therefore, it is advantageous to the larger changing magnification. However, the large refracting power is required for each lens in the first lens group, and the negative effect such as the deterioration in the chromatic aberration especially at the telephoto end is easily produced. In addition, the first lens group is increased in the thickness and diameter, and especially, it is disadvantageous to the downsizing in a collapsed state.

If the parameter, f1/fW is larger than the upper limit value of 12.0, the contrition to the changing magnification of second lens group decreases because the displacement of first lens group is large. Thereby, it becomes difficult to obtain the larger changing magnification.

As described above, the aperture stop is arranged between the second lens group and the third lens group to move independently from the neighboring second lens group and third lens group. Thereby, a more appropriate ray path can be selected in any of the changing magnification position of the large changing magnification area of 4.5 times or more, and the correction flexibility especially such as coma aberration and distortion is improved; thus, the off-axis performance can be improved.

As described above, if the interval between the aperture stop and the third lens group increases at the wide angle end than the telephoto end, the aperture stop approaches the first lens group at the wide angle end. Thereby, the height of ray passing the first lens group can be reduced, and the first lens group can be further downsized.

The condition (19) defines the positional relationship of the aperture stop and the third lens group at the wide angle end in terms of the downsizing and ensuring performance of the first lens group.

If the parameter, dsw/fT becomes smaller than the lower limit value 0.08, the height of ray passing the first lens group becomes too big at the wide angle end, causing the growing in size of the first lens group. Also, it becomes disadvantageous regarding to the ensuring of off-axis performance because the aberration in the changing magnification area is hardly likely balanced.

If the parameter, dsw/fT becomes larger than the upper limit value of 0.20, the height of ray passing the third lens group at wide angle end becomes too big. Thereby, the image surface falls to the over side, and the barrel shaped distortion increase. Especially, it becomes difficult to secure the performance at the wide filed angle.

It is preferable for the interval between the aperture stop and the third lens group to be the widest at the wide angle end and to be the narrowest at the telephoto end. If the interval between the aperture stop and the third lens group becomes the widest except at the wide angle end, it becomes difficult to balance the off-axis aberration in the entire changing magnification area because the height of ray passing the third lens group becomes the largest at the position. In addition, if the interval between the aperture stop and the third lens group becomes the narrowest except at the telephoto end, the interval between the second lens group and the third lens group can not be sufficiently reduced at the telephoto end. Thereby, it becomes difficult to correct the entire aberration because the contribution to the changing magnification of the third lens group is lowered.

As described above, if the fourth lens group is moved so as to position closer to the image side at the telephoto end than the wide angle end, the luminous flux passes the neighboring portion of the fourth lens group at the telephoto end than the wide angle end. Accordingly, the flexibility of new design can be obtained by the different effect of the aspheric surface between the wide angle end and the telephoto end. In addition, during changing the magnification from the wide angle end to the telephoto end, the magnification of the fourth lens group increases, and the fourth lens group can share the changing magnification function. Therefore, the magnification can be effectively changed in a limited space.

The conditions (20), (21) enable higher aberration correction under the achievement of the target wider filed angle (half filed angle at wide angle end: 38 degrees or more) and larger changing magnification (4.5 times or more).

The parameter of condition (20), m4T is smaller than the lower limit value of 0.60, the luminous flux emitting to the third lens group approaches aforcal. Thereby, it becomes difficult for the third lens group to share the effective changing magnification, and as a result, the share of changing magnification of the second lens group increases, and also it becomes difficult to correct the filed curvature and astigmatism which increase with the wider flied angle.

Moreover, if the parameter, m4T is larger than the upper limit value of 0.85, a required back-focus can not be secured and also the refracting power of fourth lens group becomes too small, because the fourth lens group is too close to the image side. If the refracting power of fourth lens group becomes too small, the exit pupil approaches the image surface and the ray incidence angle to the neighboring portion of the light-receiving element increases. Therefore, the shortage of light volume in the neighboring portion is easily caused.

It is more preferable for the parameter, m4T to satisfy the condition: (20A) $0.65 < m4T < 0.80$, which is slightly narrower than the condition (20).

If the parameter of condition (21), m4T/m4W is smaller than the lower limit value of 1.0, the fourth lens group does not contribute to the changing magnification. Thereby, the share of changing magnification of the third lens group increases. Accordingly, it becomes difficult to balance the image surface during changing the magnification. On the other hand, if the parameter, m4T/m4W is larger than the upper limit value of 1.3, it becomes difficult to correct the aberration with the simple structure of the fourth lens group comprising one positive lens because the share of changing magnification of the fourth lens group becomes too big.

It is preferable for the parameter, m4T/m4W to satisfy the condition: (21A) $1.05 < m4T/m4W < 1.2$, which is slightly narrower than the condition (21).

It is preferable for the positive lens comprising the fourth lens group that Abbe number of the material, v4 satisfies the condition: (23) $50 < v4 < 75$.

If the v4 is smaller than 50, the chromatic aberration, which is generated in the fourth lens group, becomes too big. Therefore, it becomes difficult to balance the axial chromatic aberration and magnification chromatic aberration over the entire zooming area. In addition, when focusing to a finite distance object by moving the fourth lens group, the fluctuation of chromatic aberration by the focusing increases. If the v4 is larger than 75, it is advantageous to the correction of chromatic aberration, but the material is expensive and also it is difficult to process both surfaces as an aspheric surface. It is more preferable for the Abbe number, v4 to satisfy the condition: (23A) $50 < v4 < 65$.

In addition, the positive lens comprising the fourth lens group can be made of plastic. The plastic material, which satisfies the above conditions (23), (23A), includes polyolefin series resin, which is represented by ZEONEX (trade name) of ZEON Corporation.

Hereinafter, explanations will be given for conditions which enable more preferable aberration correction without disturbing the downsizing of zoom lens of the present invention.

It is preferable for the second lens group to comprise three lenses having, in order from the object side, a negative lens having a large curvature surface on the image side, a positive lens having a large curvature surface on the image side, and a negative lens having a large curvature surface on the object side.

As a changing magnification group having a negative refracting power, there has been well known an arrangement having a negative lens, negative lens and positive lens in order from the object side when the changing magnification group comprises three lenses. However, compared with this structure, the above structure having the negative lens, positive lens and negative lens is superior to the correction performance of the chromatic aberration of magnification with the wider filed angle.

In this case, the second positive lens having a large curvature surface on the image side and the third negative lens having a large curvature surface on the object side from the object side can be cemented.

It is preferable for each lens of the second lens group having the above structure to satisfy the following condition.

$1.75 < N21 < 1.90, 35 < v21 < 50$ $1.65 < N22 < 1.90, 20 < v22 < 35$ $1.75 < N23 < 1.90, 35 < v23 < 50.$

In the above, N2i, v2i (i=1 to 3) represent a refractive index and Abbe number of ith lens, respectively, in the second lens group counted from the object side.

If such a glass type is selected, the chromatic aberration can be more preferably corrected.

The first lens group has one negative lens and two positive lenses in the above zoom lens according to the present invention. However, it is preferable for the first lens group to have at least one negative lens and one positive lens from the object side in the zoom lens according to the present invention, etc. More particularly, including the above arrangement, it is preferable for the first lens group to comprises two lenses, in order from the object side, having a negative meniscus lens having a convex surface on the object side and a positive lens having a strong convex surface on the object side, or it is preferable for the first lens group to comprise three lenses, in order from the object side, having a negative meniscus lens having a convex surface on the object side, a positive lens having a strong convex surface on the object side and a positive lens having a strong convex surface on the object side.

It is preferable for the third lens group to comprise three lenses having, in order from the object side, a positive lens, positive lens and negative lens, and the second positive lens and the third negative lens from the object side can be cemented.

When focusing to a finite distance, a method, which moves only the fourth lens group, is preferable because a weight of object to be moved is the minimum. The displacement of the fourth lens group is small during changing the magnification, and the fourth lens group has a merit, which has both of the moving mechanism for the changing magnification and the moving mechanism for the focusing.

In order to advance the downsizing while maintaining preferable aberration correction, it is necessary to adopt an aspheric surface. It is preferable for at least the second lens group and the third lens group to have one aspheric surface or more, respectively. Especially in the second lens group, if the most object side surface and the most image side surface comprise an aspheric surface, respectively, high effect for the correction of distortion, astigmatism and the like, which increase with the wider field angle can be obtained.

As the aspheric surface lens, molded optical glass and molded optical plastic (glass mold aspheric surface and plastic mold aspheric lens), an aspheric surface that a thin resin layer is molded on a glass lens (i.e., hybrid aspheric surface and replica aspheric surface) and the like are used. Of course the aspheric surface that the thin resin layer is molded on the glass lens is counted as one lens by combining the resin layer that the aspheric surface is formed and the glass lens that the resin layer is formed.

In order to simplify the mechanism, it is better for the opening diameter of the aperture stop to be constant regardless of the changing magnification. However, the change in F number with the changing magnification can be reduced by increasing the opening diameter of the long focal point end with respect to the short focal point end. In addition, if it is necessary to reduce the light volume, which reaches the image surface, the diameter of aperture stop can be reduced. However, it is preferable to insert a ND filter and the like without significantly changing the diameter of aperture stop so as to reduce the light volume because the resolution deteriorated by a diffraction phenomenon can be prevented.

As described above, by the above structures, the zoom lens according to the present invention can be used as a zoom lens having a sufficient wide field angle that a half field angle at a wide angle end is 38 degrees or more, changing magnification ratio of 4.5 times or more and resolution corresponding to a small image pickup device having 4 million to 8 million pixels or more, and also the information device of the present invention includes the zoom lens of the present invention as an optical system for photographing; thus, a compact information device and an information device having a high performance can be achieved.

It should be noted that although the present invention has been described with respect to specific embodiments, the invention is not limited to these specific embodiments. In view of the foregoing, it is intended that the present invention cover modifications and variations provided they fall within the scope of the following claims and their equivalents.

The invention claimed is:

1. A zoom lens, comprising:
in order from an object side, a first lens group having a positive refracting power;
a second lens group having a negative refracting power;
a third lens group having a positive refracting power;
a fourth lens group having a positive refracting power; and
the first lens group being moved to the object side during changing a magnification from a wide angle end to a telephoto end, wherein
the fourth lens group consists of one positive lens, both surfaces of the positive lens are an aspheric surface, respectively, and
total displacement of the first lens group during changing the magnification from the wide angle end to the telephoto end, X1 and an focal length of an entire system at the telephoto end, fT satisfy the following condition:

$$0.30 < X1/fT < 0.85. \quad (1)$$

2. The zoom lens according to claim 1, wherein total displacement of the third lens group during changing the magnification from the wide angle end to the telephoto end, X3 and the focal length of the entire system at the telephoto end, fT satisfy the following condition:

$$0.15 < X3/fT < 0.50. \quad (2)$$

3. The zoom lens according to claim 1, wherein a focal length of the second lens group, f2, and a focal length of the third lens group, f3 satisfy the following condition:

$$0.6 < |f2|/f3 < 1.0. \quad (3)$$

4. The zoom lens according to claim 1, wherein the first lens group and the third lens group move to the object side during changing the magnification from the wide angle end to the telephoto end.

5. The zoom lens according to claim 1, wherein, a refractive index of a material, $N_4$, an aspheric surface amount in 80% of a maximum ray effective height in the aspheric surface of the object side, $X_{40}(H_{0.8})$, an aspheric surface amount in 80% of a maximum ray effective height in the aspheric surface of an image side, $X_{41}(H_{0.8})$, and a maximum image height, $Y'_{max}$ of the positive lens comprising the fourth lens group satisfy the following condition:

$$-0.0080 < (N_4-1)X_{40}(H_{0.8})/Y'_{max} < 0.0 \quad (6)$$

$$-0.0010 < \{(N_4-1)X_{40}(H_{0.8})+(1-N_4)X_{41}(H_{0.8})\}/Y'_{max} < 0.0010. \quad (7)$$

6. An information device comprising a photographing function, wherein the zoom lens set forth in claim 1 is used as an optical system for photographing.

7. The information device according to claim 6, wherein an object image by the zoom lens is imaged on a light receiving surface of an image pickup device.

8. The information device according to claim 7, wherein the information device comprises a personal digital assistance device.

* * * * *